(12) United States Patent
Lechner et al.

(10) Patent No.: US 10,832,155 B2
(45) Date of Patent: Nov. 10, 2020

(54) DEVICE AND METHOD FOR SOLVING COMPUTATIONAL PROBLEMS USING A QUANTUM SYSTEM

(71) Applicant: Parity Quantum Computing GmbH, Innsbruck (AT)

(72) Inventors: Wolfgang Lechner, Innsbruck (AT); Philipp Hauke, Innsbruck (AT); Peter Zoller, Innsbruck (AT)

(73) Assignee: Parity Quantum Computing GmbH, Innsbruck (AT)

( * ) Notice: Subject to any disclaimer, the term of this patent is extended or adjusted under 35 U.S.C. 154(b) by 372 days.

(21) Appl. No.: 15/739,188

(22) PCT Filed: Jun. 28, 2016

(86) PCT No.: PCT/EP2016/065014
§ 371 (c)(1),
(2) Date: Dec. 22, 2017

(87) PCT Pub. No.: WO2017/001404
PCT Pub. Date: Jan. 5, 2017

(65) Prior Publication Data
US 2018/0218279 A1 Aug. 2, 2018

(30) Foreign Application Priority Data
Jun. 29, 2015 (EP) .................... 15174362

(51) Int. Cl.
*G06N 10/00* (2019.01)
(52) U.S. Cl.
CPC .................... *G06N 10/00* (2019.01)
(58) Field of Classification Search
CPC ...................................................... G06N 10/00
See application file for complete search history.

(56) References Cited

U.S. PATENT DOCUMENTS

| 8,190,548 B2 | 5/2012 | Choi |
| 8,195,596 B2 | 6/2012 | Rose et al. |

(Continued)

FOREIGN PATENT DOCUMENTS

| RU | 119479 U1 | 8/2012 |
| RU | 2538296 C2 | 1/2015 |

OTHER PUBLICATIONS

Written Opinion issued by the Intellectual Property Office of Singapore for Application No. 11201710858T dated Aug. 29, 2018.
(Continued)

*Primary Examiner* — Alan Chen
(74) *Attorney, Agent, or Firm* — Meunier Carlin & Curfman LLC

(57) ABSTRACT

A method of computing a solution to a computational problem using a quantum system comprising a plurality of qubits is provided. The method includes encoding the computational problem into a problem Hamiltonian of the quantum system, wherein the problem Hamiltonian is a single-body Hamiltonian including a plurality of adjustable parameters, and wherein the encoding includes determining, from the computational problem, a problem-encoding configuration for the plurality of adjustable parameters. The method further includes evolving the quantum system from an initial quantum state towards a ground state of a final Hamiltonian of the quantum system, wherein the final Hamiltonian is the sum of the problem Hamiltonian and a short-range Hamiltonian, wherein the plurality of adjustable parameters of the problem Hamiltonian are in the problem-encoding configuration and wherein the short-range Hamiltonian is a d-body Hamiltonian, wherein d is independent of the computational problem. The method further includes measuring at least a portion of the plurality of qubits to obtain a read-out of the quantum system. The method further (Continued)

includes determining a solution to the computational problem from the read-out.

15 Claims, 11 Drawing Sheets

(56) References Cited

U.S. PATENT DOCUMENTS

| | | | |
|---|---|---|---|
| 2011/0060780 A1* | 3/2011 | Berkley | B82Y 10/00 |
| | | | 708/207 |
| 2012/0254586 A1 | 10/2012 | Mohammad et al. | |
| 2015/0111754 A1 | 4/2015 | Richard et al. | |
| 2015/0332164 A1* | 11/2015 | Maassen van den Brink | ............. |
| | | | H03K 3/38 |
| | | | 709/217 |
| 2016/0314407 A1* | 10/2016 | Bunyk | G06N 10/00 |
| 2018/0267933 A1* | 9/2018 | Lanting | G06F 17/00 |
| 2018/0373996 A1* | 12/2018 | Amin | G06F 15/82 |
| 2019/0302107 A1* | 10/2019 | Kauffman | G16C 20/60 |

OTHER PUBLICATIONS

Georgeot B. & Shepelyansky D. L., Quantum chaos border for quantum computing. Physical Review E, Sep. 1, 2000, vol. 62, No. 3, pp. 3504:1-4.
Leandro Aolita et al. "Gapped Two-Body Hamiltonian for continuous-variable quantum computation", Cornell University Library, Jul. 6, 2010.
Aolita, L. et al. "Gapped Two-Body Hamiltonian for continuous-variable quantum computation", Cornell University Library, Jul. 6, 2010.
International Search Report and Written Opinion dated Sep. 27, 2016, from International Application No. PCT/EP2016/065014, 15 pages.

* cited by examiner

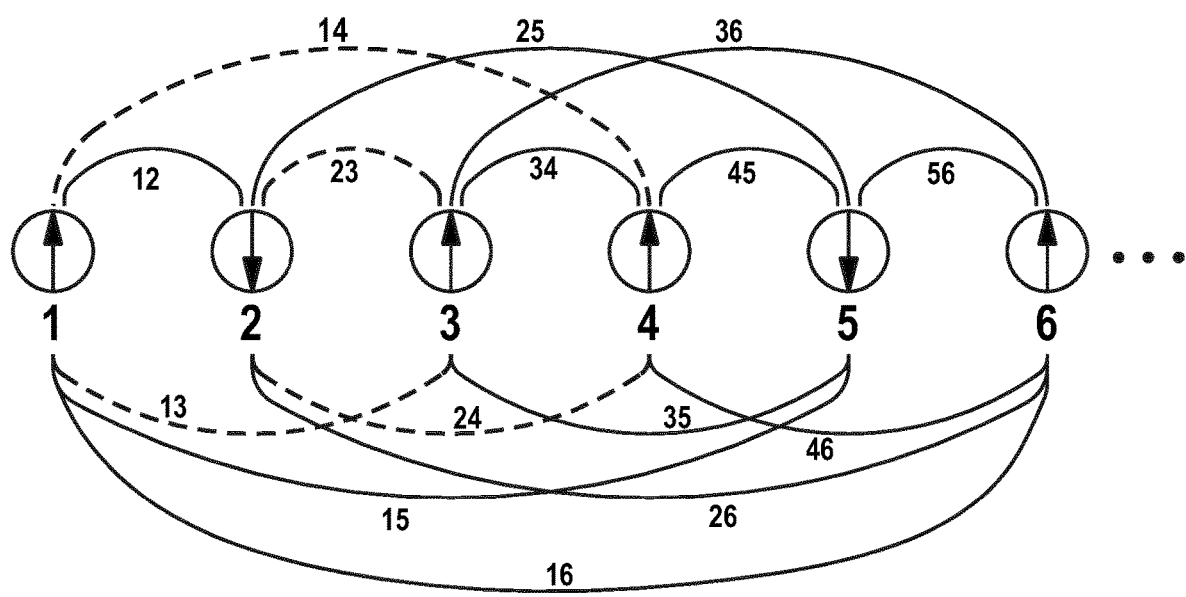

i  j  k

↑ ↑ ↑ = 1
↑ ↑ ↓ = 0
↑ ↓ ↑ = 0
↑ ↓ ↓ = 1
↓ ↑ ↑ = 0
↓ ↑ ↓ = 1
↓ ↓ ↑ = 1
↓ ↓ ↓ = 0

⓪ = |0⟩   ① = |1⟩

⓪ = 0, 2, 4

DEVICE AND METHOD FOR SOLVING COMPUTATIONAL PROBLEMS USING A QUANTUM SYSTEM

FIELD

Embodiments described herein relate to apparatuses and methods for computing solutions to computational problems using a quantum system, and more specifically a quantum system including a plurality of quantum bits (qubits).

BACKGROUND

Computing devices based on classical information processing, i.e., computing devices not making use of quantum mechanical effects, once started out as hard-wired calculators which could only perform specific operations. The transition to fully programmable computers revolutionized the field and started the information age. Currently, quantum computing devices, i.e., computing devices which, possibly in addition to using classical information processing, make use of quantum mechanical effects to solve computational problems, are in some sense in the stages of the hard-wired calculators in that they can only tackle computational problems for which they are particularly designed, i.e., "hard-wired". In particular, all existing quantum computing devices, across all platforms and disciplines, still fall short of being fully programmable and scalable.

For instance, the quantum computing device by D-WAVE SYSTEMS Inc., based on superconducting qubits, forms two groups of qubits, wherein arbitrary interactions can take place between qubits in different groups, but no interactions take place between qubits in the same group. Additional groups of qubits may be added, but with the same constraints. This quantum computing device is therefore restricted by its hard-wired constraints which do not allow for the necessary interactions to realize both a fully programmable and scalable architecture.

Therefore, there is a need for improved methods and devices for solving computational problems using a quantum system.

SUMMARY

According to an embodiment, a method of computing a solution to a computational problem using a quantum system including a plurality of qubits is provided. The method includes encoding the computational problem into a problem Hamiltonian of the quantum system, wherein the problem Hamiltonian is a single-body Hamiltonian including a plurality of adjustable parameters, and wherein the encoding includes determining, from the computational problem, a problem-encoding configuration for the plurality of adjustable parameters. The method further includes evolving the quantum system from an initial quantum state towards a ground state of a final Hamiltonian of the quantum system, wherein the final Hamiltonian is the sum of the problem Hamiltonian and a short-range Hamiltonian, wherein the plurality of adjustable parameters of the problem Hamiltonian are in the problem-encoding configuration and wherein the short-range Hamiltonian is a d-body Hamiltonian, wherein d is independent of the computational problem. The method further includes measuring at least a portion of the plurality of qubits to obtain a read-out of the quantum system. The method further includes determining a solution to the computational problem from the read-out.

According to a further embodiment, a method of computing a solution to a computational problem using a quantum system comprising a plurality of qubits is provided. The method includes encoding the computational problem into a problem Hamiltonian of the quantum system, wherein the problem Hamiltonian is a single-body Hamiltonian including a plurality of adjustable parameters, and wherein the encoding includes determining, from the computational problem, a problem-encoding configuration for the plurality of adjustable parameters. The method further includes initializing the quantum system in an initial quantum state. The method further includes evolving the quantum system from the initial quantum state to a final quantum state by performing quantum annealing, wherein performing quantum annealing includes passing from an initial Hamiltonian of the quantum system to a final Hamiltonian of the quantum system. Therein, the final Hamiltonian is the sum of the problem Hamiltonian and a short-range Hamiltonian, wherein the plurality of adjustable parameters of the problem Hamiltonian are in the problem-encoding configuration and wherein the short-range Hamiltonian is a d-body Hamiltonian, wherein d is independent of the computational problem. The method further includes measuring at least a portion of the plurality of qubits to obtain a read-out of the final quantum state. The method further includes determining a solution to the computational problem from the read-out.

According to a further embodiment, an apparatus for computing solutions to computational problems is provided. The apparatus includes a quantum system comprising a plurality of qubits. The apparatus further includes a cooling unit adapted for cooling the quantum system towards a ground state of the quantum system. The apparatus further includes a programmable quantum annealing unit adapted for evolving, by quantum annealing, an initial Hamiltonian of the quantum system into a final Hamiltonian of the quantum system, wherein the final Hamiltonian is the sum of a problem Hamiltonian and a short-range Hamiltonian, wherein the problem Hamiltonian is a single-body Hamiltonian including a plurality of adjustable parameters. The apparatus further includes a measurement device adapted for measuring at least a portion of the plurality of qubits. The apparatus further includes a classical computing system connected to the programmable quantum annealing unit and to the measurement device. The classical computing system is configured for: receiving, as an input, a computational problem; encoding the computational problem into the problem Hamiltonian, wherein the encoding comprises determining, from the computational problem, a problem-encoding configuration for the plurality of adjustable parameters of the problem Hamiltonian; and communicating the problem-encoding configuration to the quantum annealing unit. The programmable quantum annealing unit is configured for: receiving the problem-encoding configuration from the classical computing system; and evolving, by quantum annealing, the initial Hamiltonian into the final Hamiltonian, wherein the plurality of adjustable parameters of the problem Hamiltonian are in the problem-encoding configuration. The classical computing system is further configured for: receiving a read-out of the quantum system from the measurement device; and determining a solution to the computational problem from the read-out.

According to a further embodiment, a programmable quantum annealing device for computing solutions to computational problems is provided. The programmable quantum annealing device includes a quantum system including a plurality of superconducting qubits arranged according to a two-dimensional lattice. The programmable quantum annealing device further includes a magnetic flux bias assembly including a plurality of magnetic flux bias units configured for generating a plurality of adjustable magnetic fluxes. Therein, each adjustable magnetic flux acts on a single superconducting qubit in the plurality of superconducting qubits. The programmable quantum annealing device further includes a coupling unit including at least one superconducting quantum interference device configured for coupling the plurality of superconducting qubits according to a plaquette Hamiltonian. The programmable quantum annealing device further includes a controller connected to the magnetic flux bias unit and to the coupling unit. The controller is configured for receiving a problem-encoding configuration for a plurality of adjustable parameters of a problem Hamiltonian of the quantum system, wherein the problem Hamiltonian is a single-body Hamiltonian and wherein the problem-encoding configuration encodes a computational problem. The controller is further configured for controlling the magnetic flux bias assembly and the coupling unit to evolve an initial Hamiltonian of the quantum system into a final Hamiltonian of the quantum system by quantum annealing. The final Hamiltonian is the sum of the plaquette Hamiltonian and the problem Hamiltonian, wherein the plurality of adjustable parameters of the problem Hamiltonian are in the problem-encoding configuration.

Embodiments are also directed to methods for operating the disclosed systems and devices, and to the use of the disclosed system to perform the methods according to the embodiments described herein.

Further advantages, features, aspects and details that can be combined with embodiments described herein are evident from the dependent claims, the description and the drawings.

BRIEF DESCRIPTION OF THE DRAWINGS

A full and enabling disclosure to one of ordinary skill in the art is set forth more particularly in the remainder of the specification including reference to the accompanying drawings wherein:

FIGS. 9-16 illustrate specific encodings of a computational problem into a problem Hamiltonian and the corresponding final Hamiltonian, according to embodiments described herein.

DETAILED DESCRIPTION

Figure 1:
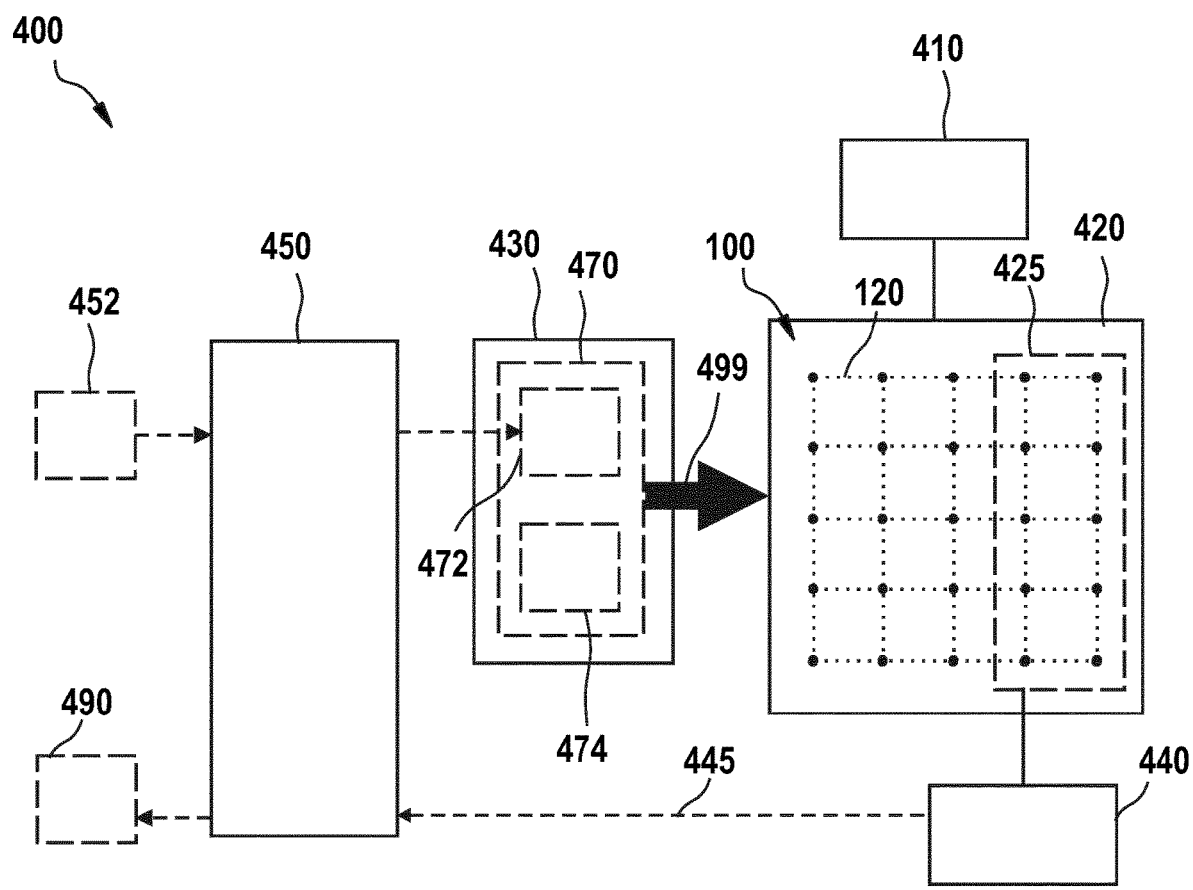
FIG. 1 shows an apparatus for computing solutions to computational problems using a quantum system, according to embodiments described herein.

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. The structures shown in the drawings are not necessarily depicted true to scale, and may contain details drawn in an exaggerated way to allow for a better understanding of the embodiments.

Embodiments described herein relate to a quantum system including a plurality of qubits. A qubit, as described herein, may refer to a quantum mechanical two-level system. A qubit may include two quantum basis states $|0\rangle$ and $|1\rangle$ representing possible quantum states of the qubit. According to the superposition principle of quantum mechanics, every superposition of the form $a|0\rangle+b|1\rangle$ is a possible quantum state of the qubit. Therein, a and b are complex numbers. Mathematically, a qubit may be represented by a two-dimensional vector space. A plurality of qubits may have quantum basis states corresponding to configurations in which each qubit of the plurality of qubits is either in the quantum state $|0\rangle$ or in the quantum state $|1\rangle$. Considering, for example, a plurality of five qubits, an exemplary quantum basis state for the 5 qubits may be $|00101\rangle$. Therein, the quantum state $|00101\rangle$ represents a configuration wherein the first, second and fourth qubit are in the quantum state $|0\rangle$ and the third and fifth qubit are in the quantum state $|1\rangle$. For a plurality of m qubits, there are $2^m$ quantum basis states. In view of the superposition principle, given two quantum states for a plurality of qubits, a superposition of the quantum basis states is also a quantum state for the plurality of qubits. For example, a superposition of the form $a|00101\rangle+b|11110\rangle+c|11111\rangle$, with a, b and c complex numbers, is a quantum state for the plurality of qubits. Mathematically, a quantum system consisting of a plurality of m qubits can be represented by a $2^m$-dimensional vector space.

The plurality of qubits may include or consist of a plurality of superconducting qubits, e.g. transmon or flux qubits. A superconducting qubit may include a primary and a secondary superconducting loop. Superconducting currents propagating clockwise and counter-clockwise, respectively, in the primary superconducting loop can form the quantum basis states $|1\rangle$ and $|0\rangle$ of the superconducting qubit. Further, a magnetic flux bias through the secondary superconducting loop can couple the quantum basis states $|0\rangle$ and $|1\rangle$.

Alternatively, the quantum system may be realized using a system of trapped ions. In this case, the quantum basis states $|0\rangle$ and $|1\rangle$ of a qubit are formed by two levels of a Zeeman- or hyperfine manifold or across a forbidden optical transition of alkaline earth, or alkaline earth-like positively charged ions, such as Ca40+.

As yet a further alternative, the quantum system may be realized using ultracold atoms, e.g. ultracold neutral Alkali atoms, which are trapped in an optical lattice or large spacing lattices from laser fields. The atoms can be evolved towards a ground state using laser cooling. The quantum basis states of a qubit are formed by the ground state of an atom and a high-lying Rydberg state. The qubits can be addressed by laser light.

As yet a further alternative, the quantum system may be realized with quantum dots. Quantum Dot Qubits may be fabricated from GaAs/AlGaAs heterostructures. The qubits are encoded in spin states, which may be prepared by adiabatically tuning the potential from a single well to a double well potential.

As yet a further alternative, the quantum system may be realized with impurities in solid-state crystals, such as NV Centers, which are point defects in diamond crystals. Other impurities are being investigated, e.g., color centers tied to chromium impurities, rare-earth ions in solid-state crystals, or defect centers in silicon carbide. NV Centers have two unpaired electrons, which provides a spin–1 ground state that allows the identification of two sharp defect levels with large life times that can be used to realize a qubit, possibly in conjunction with the surrounding nuclear spins.

According to embodiments, the quantum system may include one or more, or a plurality of individual q-level quantum systems, wherein q may be a constant. For example, q may be in the range from 2 to 8, e.g., 3, 4, 5, or 6. An individual q-level quantum system may include a basis consisting of q states $|0\rangle, |1\rangle, \ldots |q-1\rangle$. An individual 3-level quantum system will be referred to as a "qutrit".

A Hamiltonian of a quantum system can represent an interaction or a plurality of interactions for the quantum system. A Hamiltonian is an operator acting on the quantum system. Eigenvalues of a Hamiltonian correspond to an energy spectrum of the quantum system. The ground state of a Hamiltonian is the quantum state of the quantum system with minimal energy. The ground state of a Hamiltonian may be a quantum state at zero temperature.

A classical computing system, as described herein, may refer to a computing system operating with classical bits. A classical computing system may include a central processing unit (CPU) for processing information with classical bits and/or a memory for storing information with classical bits. A classical computing system may include one or more conventional computers and/or a network of conventional computers, such as personal computers (PCs).

Before providing a detailed description of embodiments, some aspects of the present disclosure will now be explained with reference to FIG. 1, which is illustrating an exemplary apparatus 400 for computing solutions to computational problems according to embodiments described herein.

The apparatus 400 shown in FIG. 1 is adapted for computing solutions to computational problems using a quantum system 420. The quantum system 420 includes a plurality of qubits 100, each of which is represented in FIG. 1 by a black dot. According to the embodiment shown in FIG. 1, the plurality of qubits 100 are arranged according to a 2-dimensional lattice 120, in particular a two-dimensional square lattice.

FIG. 1 further shows a cooling unit 410 configured for cooling the quantum system 420. The cooling unit 410 may cool the quantum system 420 to an operating temperature.

FIG. 1 further shows a classical computing system 450. The classical computing system 450 is configured for receiving, as an input, a computational problem 452 to be solved. The computational problem 452 may, e.g., be an NP-hard problem, such as, e.g., the traveling salesman problem or the Ising spin model problem. Therein, "NP" stands for "non-deterministic polynomial time".

The classical computing system 450 is further configured for encoding the computational problem 452 into a problem Hamiltonian 472 of the quantum system 420. According to the exemplary embodiment illustrated in FIG. 1, the problem Hamiltonian 472 has the form $H^{prob}=\Sigma_k J_k \sigma_z^{(k)}$, wherein $\sigma_z^{(k)}$ is a Pauli operator acting on a k-th qubit of the plurality of qubits 100, and wherein each $J_k$ is an adjustable parameter determined by one or more external entities, e.g. magnetic fields, which can be adjusted at every qubit k individually. For example, $J_k$ may be the strength of an adjustable magnetic field influencing the k-th qubit. A plurality of adjustable external entities, e.g. magnetic fields, may be provided, wherein each adjustable external entity influences a single qubit of the plurality of qubits. By adjusting the external entities, the parameters $J_k$ can be adjusted depending on the computational problem 452.

Encoding the computational problem 452 in the problem Hamiltonian 472, as performed by the classical computing system 450, includes determining, from the computational problem 452, a problem-encoding configuration for the plurality of adjustable parameters $J_k$. For each of the adjustable parameters $J_k$, a parameter value may be determined depending on the computational problem 452. Accordingly, the problem-encoding configuration depends on the computational problem.

FIG. 1 further shows a programmable quantum annealing unit 430 adapted for performing quantum annealing by passing from an initial Hamiltonian of the quantum system 420 to a final Hamiltonian of the quantum system 420.

According to the embodiment described with respect to FIG. 1, the initial Hamiltonian has the form $H^{init}=\Sigma_k a_k \sigma_x^{(k)}$, wherein $a_k$ is a coefficient and wherein $\sigma_x^{(k)}$ is a Pauli operator acting on the k-th qubit in the plurality of qubits 100. The Pauli operators $\sigma_z^{(k)}$ and $\sigma_x^{(k)}$ may be non-commuting, in particular anti-commuting, Pauli operators. The initial Hamiltonian $H^{init}$ may be independent of the computational problem 452.

Figure 7:
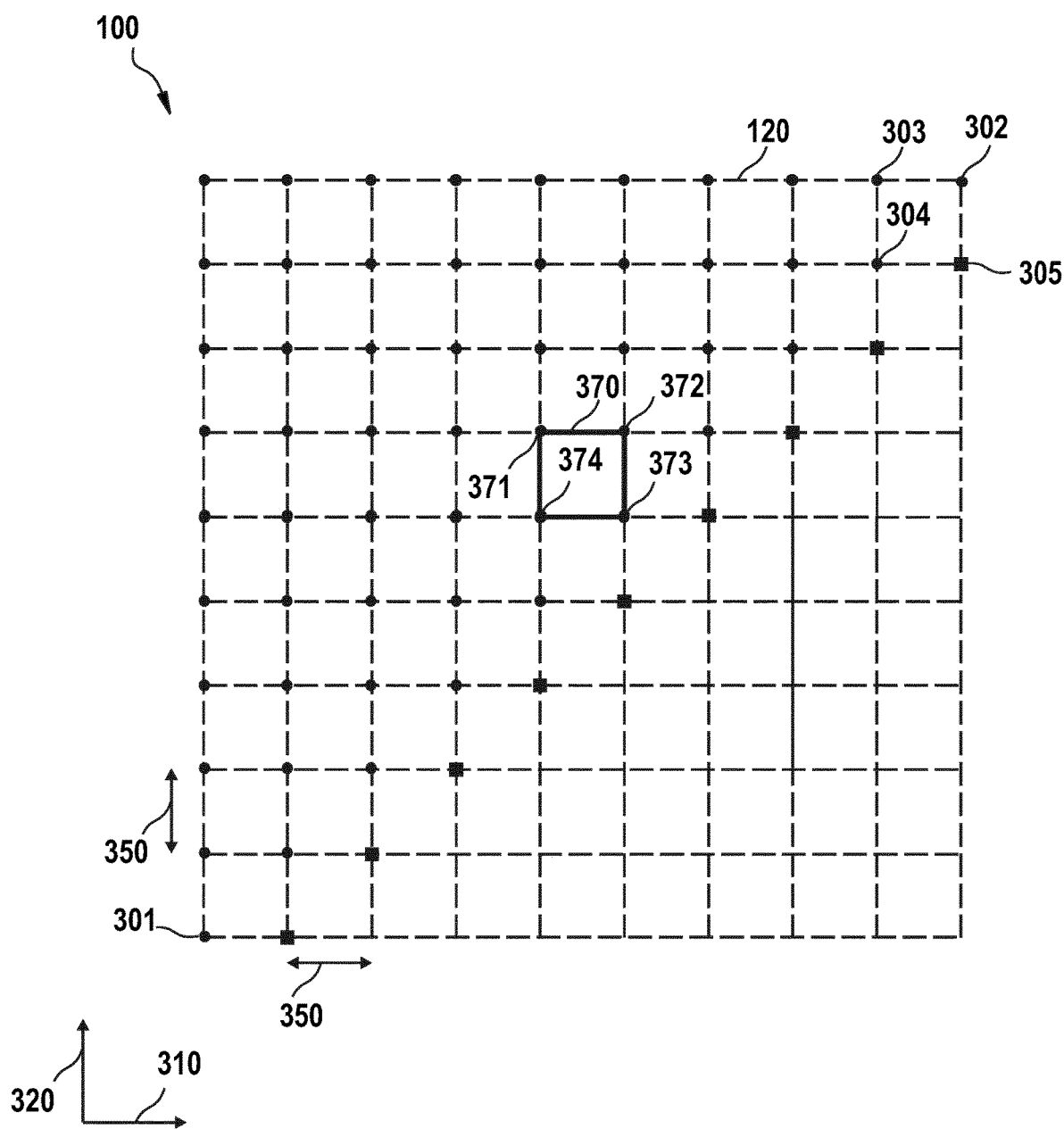

The final Hamiltonian is the sum of the problem Hamiltonian 472 and a short-range Hamiltonian 474. According to the exemplary embodiment, the short-range Hamiltonian 474 is a plaquette Hamiltonian representing interactions between groups of qubits corresponding to plaquettes. The plaquettes may, e.g. be elementary squares of a 2-dimensional square lattice according to which the qubits are arranged. FIG. 7, described in more detail below, shows an example of a plaquette 370 of a 2-dimensional lattice according to embodiments described herein. The short-range Hamiltonian is a d-body Hamiltonian, e.g. a 4-body plaquette Hamiltonian, wherein d is independent of the computational problem 452. According to embodiments, the short-range Hamiltonian 474 may be independent of the computational problem 452.

As mentioned above, the computational problem 452 is encoded in the problem Hamiltonian 472, in particular in the problem-encoding configuration of the adjustable parameters $J_k$. According to embodiments, the encoding is such that the final Hamiltonian 470, being the sum of the problem Hamiltonian 472 and the short-range Hamiltonian 474, has a ground state containing information about a solution to the computational problem 452. Accordingly, if the quantum system 420 is in the ground state of the final Hamiltonian 470, the information about the computational problem may be revealed by measuring the quantum system 420.

According to embodiments described herein, and as indicated by arrow 499 in FIG. 1, the quantum system 420 is evolved towards the ground state of the final Hamiltonian 470, wherein the plurality of adjustable parameters of the problem Hamiltonian 472 are in the problem-encoding configuration. According to the embodiment shown in FIG. 1, the quantum system 420 is evolved towards the ground state of the final Hamiltonian 470 by the quantum annealing unit 430 performing quantum annealing. Therein, performing quantum annealing includes passing from the initial Hamiltonian to the final Hamiltonian 470.

According to the exemplary embodiment, the quantum system 420 is initialized in an initial quantum state by cooling the quantum system 420 towards a ground state of the initial Hamiltonian. Further, the programmable quantum annealing unit 430 is adapted for evolving the quantum system 420 from the initial quantum state at an initial time to a final quantum state at a final time, by performing quantum annealing. The quantum annealing may include passing from the initial Hamiltonian at the initial time to the final Hamiltonian 470 at the final time to evolve the quantum system 420 from the initial quantum state to the final quantum state. The quantum annealing may be performed while the quantum system 420 is maintained at substantially the operating temperature by the cooling unit 410.

The quantum annealing may include gradually, e.g. adiabatically, passing from the initial Hamiltonian $H^{init}$ to the final Hamiltonian $H^{final}=H^{prob}+H^{SR}$, where $H^{SR}$ is the short-range Hamiltonian, via an interpolation Hamiltonian H(t). According to the exemplary embodiment illustrated in FIG. 1, the interpolation Hamiltonian has the form $H(t)=A(t) H^{init}+B(t) H^{prob}+C(t) H^{SR}$. Therein, $H^{init}$ may refer to the initial Hamiltonian, $H^{final}$ may refer to the final Hamiltonian, t may be a time parameter, and A(t), B(t) and C(t) may be interpolation coefficients depending on the time parameter t. For t being the initial time to, the interpolation coefficient $A(t_0)$ may be equal to the initial value 1, and the interpolation coefficient $B(t_0)$ may be equal to the initial value 0. Alternatively, for t being the initial time to, the interpolation coefficient $A(t_0)$ may be much larger than the interpolation coefficient $B(t_0)$. For t being the final time $t_{fin}$, the interpolation coefficients $A(t_{fin})$ may be equal to the final value 0, and $B(t_{fin})$ and $C(t_{fin})$ may be equal to the final value 1, respectively, so that the interpolation Hamiltonian $H(t_{fin})$ is equal to $H^{final}$. Alternatively, for t being the final time $t_{fin}$, the interpolation coefficient $A(t_{fin})$ may be much smaller than the interpolation coefficients $B(t_{fin})$ and $C(t_{fin})$. Performing quantum annealing may include gradually, e.g. adiabatically, changing the interpolation coefficients A(t), B(t) and C(t) from their initial values at the initial time to their final values at the final time. Accordingly, the interpolation Hamiltonian is gradually changed from the initial Hamiltonian at the initial time to the final Hamiltonian at the final time. In particular, the quantum annealing procedure as described herein may be executed so that C(t)=B(t) at all times.

In view of e.g. the adiabatic theorem of quantum mechanics, but without wishing to be bound to any particular theory, the quantum state of the quantum system 420 will be the ground state or at least be well-approximated by a ground state of the interpolation Hamiltonian H(t) for all values of the time parameter t ranging from the initial time to the final time if the passage from the initial Hamiltonian to the final Hamiltonian 470 is performed slowly enough. Accordingly, quantum annealing evolves the initial quantum state at the initial time to the final quantum state at the final time, wherein the final quantum state is the ground state of the final Hamiltonian or at least is well-approximated by a ground state of the final Hamiltonian 470.

FIG. 1 further shows a measurement device 440 adapted for measuring the quantum system 420. As shown, the measurement device 440 may be adapted for measuring a portion 425 of the qubits of the plurality of qubits 100. Using the measurement device 440, the portion 425 may be measured to obtain a read-out of the final quantum state. The final quantum state, being well-approximated by the ground state of the final Hamiltonian, contains information about the solution to the computational problem 452. The read-out of the final quantum state can reveal the information about the solution. According to the embodiment shown in FIG. 1, the read-out may be provided from the measurement device 440 to the classical computing system 450, as indicated in FIG. 1 by arrow 445. The classical computing system 450 may determine the solution 490 to the computational problem from the readout. The classical computing system 450 may at least determine a trial solution to the computational problem, and verify if the trial solution actually is a solution to the computational problem. For NP problems, the verification is a computation which can be carried out in polynomial time, and can typically be easily computed. If it turns out that no solution to the computational problem was found, the process is repeated until a solution to the computational problem is found.

Figure 8:
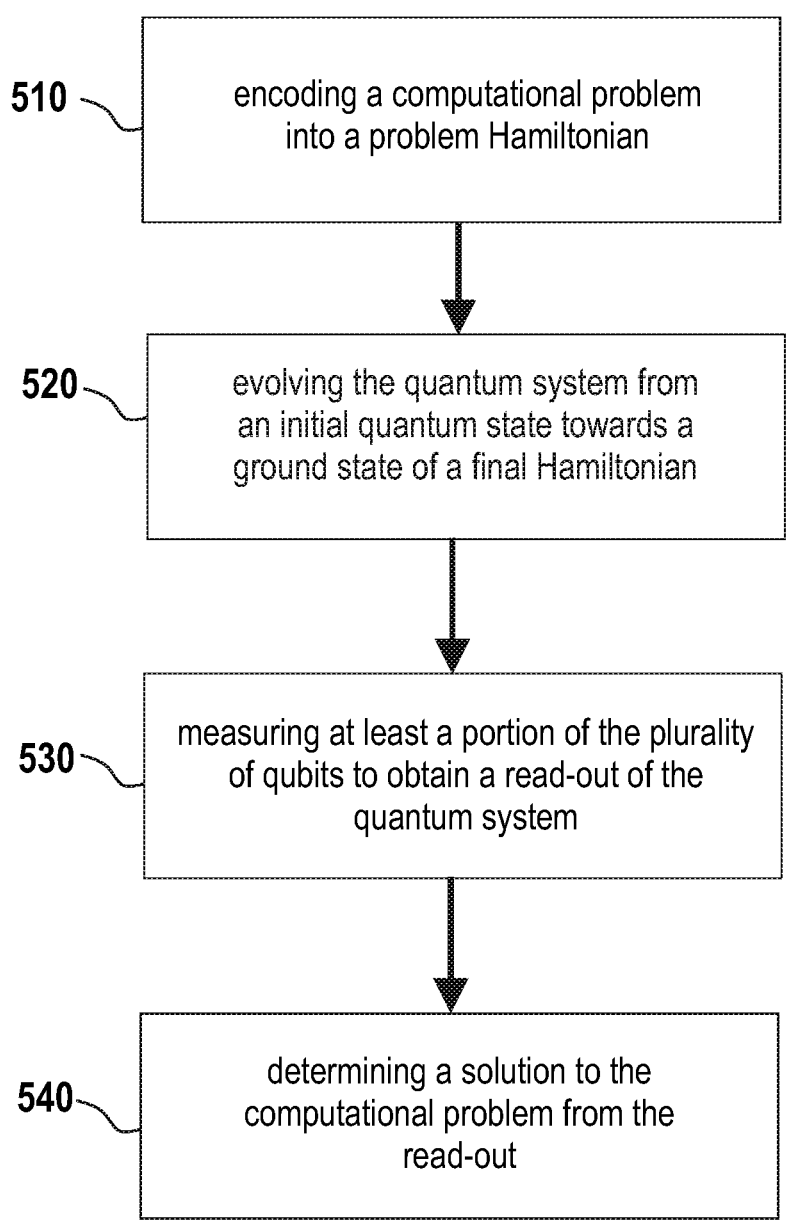
FIG. 8 illustrates a method for computing a solution to a computational problem using a quantum system comprising a plurality of qubits.

In light of the above, according to an embodiment, a method of computing a solution to a computational problem using a quantum system including a plurality of qubits is provided. The method includes encoding the computational problem into a problem Hamiltonian of the quantum system, as illustrated in FIG. 8 with box 510. The problem Hamiltonian is a single-body Hamiltonian including a plurality of adjustable parameters, and the encoding includes determining, from the computational problem, a problem-encoding configuration for the plurality of adjustable parameters. The method further includes evolving the quantum system from an initial quantum state towards a ground state of a final Hamiltonian of the quantum system, as illustrated in FIG. 8 with box 520. The final Hamiltonian is the sum of the problem Hamiltonian and a short-range Hamiltonian, wherein the plurality of adjustable parameters of the problem Hamiltonian are in the problem-encoding configuration. In some embodiments, the short-range Hamiltonian is a d-body Hamiltonian with d independent of the computational problem. The method further includes measuring at least a portion of the plurality of qubits to obtain a read-out of the quantum system, as illustrated in FIG. 8 with box 530. The method further includes determining a solution to the computational problem from the read-out, as illustrated in FIG. 8 with box 540.

Embodiments described herein thus allow determining a solution to a computational problem, e.g. an NP-hard problem, using the quantum system. Compared to determining a solution to a computational problem using solely a classical computing system, i.e., without a quantum system, embodiments described herein may provide a decrease in computational time required for solving the computational problem. In other words, compared to classical computing systems, embodiments described herein may allow solving computational problems faster, or may even enable finding such a solution at all since the computation of the solution may take too long on a classical computing system to compute.

A further advantage relates to the aspect according to which the problem Hamiltonian is a single-body Hamiltonian. While other types of problem Hamiltonians, in particular problem Hamiltonians involving interactions between large groups of qubits or interactions between qubits being distant from each other (long-range interactions), may be infeasible or at least require a very complicated set-up of the quantum system and of the components driving the quantum computation, a single-body problem Hamiltonian, as described herein, can be realized using a much simpler set-up, i.e., a much simpler quantum processing device. In addition, the problem Hamiltonian of the embodiments described herein with its adjustable parameters provides a fully programmable system with which a wide range of computational problems can be encoded. The devices and methods according to embodiments described herein therefore allow for computing a solution to a wide range of computational problems, such as NP-hard problems. Compared to systems where only a limited number of problems can be encoded since certain interactions required by the problem Hamiltonian are hard-wired into the system, an increased flexibility and a much more powerful device and method is thereby provided.

A yet further advantage relates to the aspect according to which the final Hamiltonian is the sum of the problem Hamiltonian and a short-range Hamiltonian. The short-range Hamiltonian may be a sum of summand Hamiltonians, wherein the summand Hamiltonians may be constraint Hamiltonians as described herein. Having a short-range Hamiltonian provides the advantage that no interactions between distant qubits need to be engineered. This is again in contrast to Hamiltonians requiring long-range interactions that may be infeasible to realize on the quantum system or may at least require a very complicated set-up of the quantum processing device.

When the parameter d of the short-range d-body Hamiltonian is independent of the computational problem, this means that the computation can be realized with the same quantum processing device irrespective of which computational problem is encoded. If the short-range Hamiltonian is independent of the computational problem the additional advantage is provided that the interactions between the qubits determined by the short-range Hamiltonian need not be changed for different computational problems.

Embodiments described herein provide for a scalable architecture for computing solutions to computational problems. For a given quantum system, solutions to a wide variety of computational problems of a certain maximal size can be computed, wherein the maximal size is determined by the number of qubits of the quantum system. To compute solutions of computational problems beyond this maximal size, a larger quantum system, i.e. a quantum system containing a larger number of qubits, can be provided, with a corresponding problem Hamiltonian, short range Hamiltonian and final Hamiltonian according to embodiments described herein, to treat computational problems of a larger size. By choosing a quantum system having a suitably large number of qubits, solutions can thus be computed for computational problems of any desired size. Irrespective of the number of qubits of the quantum system, the problem Hamiltonian is a single-body Hamiltonian and the final Hamiltonian is the sum of the problem Hamiltonian and a short-range Hamiltonian, according to embodiments described herein. Accordingly, a scalable architecture for computing solutions to computational problems is provided.

According to some embodiments, the computational problem may be a decision problem. A decision problem may refer to a computational problem being formulated as a yes/no question. The solution to a decision problem may be either "yes" or "no". Alternatively, the solution to a decision problem may be a single classical bit, i.e. either 0 or 1. According to other embodiments, the computational problem may be formulated in a manner different from a decision problem.

The computational problem may be any one of a variety of computational problems considered in, e.g., the fields of computer science, physics, chemistry or engineering. For the purpose of explanation, but without intending to limit the scope, three examples of computational problems are discussed in the following. The three examples discussed below are examples of decision problems.

A first example of a computational problem according to embodiments described herein is the "traveling salesmen problem". The traveling salesman problem involves a first list of cities and a second list of distances between each pair of cities in the first list. The traveling salesman problem asks the following question: "Given the first list, the second list and a constant K, does there exist a tour of length at most K, wherein the tour (i) visits each city in the first list exactly once and (ii) returns to the city in which the tour starts?"

A second example of a computational problem according to embodiments described herein is the "3-colorability problem" relating to coloring of mathematical graphs. A mathematical graph may include a set of vertices and a set of edges representing connections between pairs of vertices. A 3-coloring of a mathematical graph is an assignment of each vertex of the mathematical graph to one of three possible colors (say, "red", "green" or "blue") wherein any pair of vertices connected by an edge are assigned to different colors. For some mathematical graphs, a 3-coloring may not exist. The 3-colorability problem asks the question: "Given a mathematical graph, does there exist a 3-coloring?"

A third example of a computational problem according to embodiments described herein relates to the Ising spin model. The Ising spin model is a physics model representing interactions between a plurality of spins $s_1, s_2, \ldots, s_n$, wherein each spin $s_i$ is a variable which can have either the value 1 or the value −1, with i ranging from 1 to n. For the plurality of spins, an Ising energy function $H(s_1, s_2, \ldots, s_n)$ may be considered, wherein the Ising energy function has the form $$H(s_1, s_2, \ldots, s_n) = \Sigma_{ij} c_{ij} s_i s_j + \Sigma_i c_i s_i$$

wherein each $c_{ij}$ is a coupling coefficient and each $c_i$ is a field coefficient. The Ising energy function involves pair-wise interactions, wherein a pair-wise interaction between spins $s_i$ and $s_j$ is represented by the term $c_{ij} s_i s_j$ in the Ising energy function. The absolute value of the coupling coefficient $c_{ij}$ reflects the strength of the pairwise interaction between the spins $s_i$ and $s_j$. The sign of the coupling coefficient c, reflects the nature of the pairwise interaction, e.g. ferromagnetic or antiferromagnetic interactions. The Ising spin model may be a long-range Ising spin model. A long-range Ising spin model may include interactions between pairs of spins which are distant from each other according to a distance measure. A long-range Ising spin model may include interactions between pairs of spins which are distant from each other by a distance being at least the logarithm of the maximal distance between two spins. Some long-range Ising spin models, e.g. all-to-all Ising spin models, may involve interactions between all pairs of spins. For example, an Ising spin model where each of the coupling coefficients cij is non-zero may be considered to be a long-range Ising spin model.

The Ising energy function further includes terms $c_i s_i$ representing an interaction between a spin $s_i$ and an external field influencing the spin $s_i$ but not influencing the other spins. The strength and direction of the field influencing the spin si are represented by the absolute value and the sign of the field coefficient $c_i$, respectively. A computational problem associated with the Ising spin model, referred to herein as the Ising spin model problem, can be formulated as follows: "Given a set of coupling coefficients $c_{ij}$, a set of field coefficients $c_i$ and a constant K, does there exist a configuration $(s_1, s_2, \ldots, s_N)$ of the spins such that $H(s_1, s_2, \ldots, s_n)$ is smaller than K?".

According to embodiments described herein, the computational problem may include a plurality of input variables.

The plurality of input variables may represent information regarding the computational problem to be solved. For example, referring to the three examples of computational problems described above, the plurality of input variables may include: the first list of cities and the second list of distances (for the traveling salesman problem); the sets of vertices and edges of a graph (for the 3-colorability problem); the sets of coupling coefficients c, and field coefficients $c_i$ (for the Ising spin model problem).

According to embodiments, computing a solution to the computational problem may include computing a trial solution to the computational problem. A trial solution may or may not be a true solution to the computational problem. For embodiments according to which the computational problem belongs to the complexity class NP, computing a solution to the computational problem may include computing a set of witness variables, as described below.

According to embodiments described herein, a solution to the computational problem is computed using the quantum system comprising the plurality of qubits. The plurality of qubits may comprise at least 8 qubits, in particular at least 3 qubits. Additionally or alternatively, the plurality of qubits may include N qubits, wherein N is between 100 and 10.000 qubits, preferably even more. It shall be understood that the plurality of qubits 100 shown in the figures described herein are shown for illustrational and explanatory purposes, and the actual number of qubits may depart therefrom.

Figure 2:
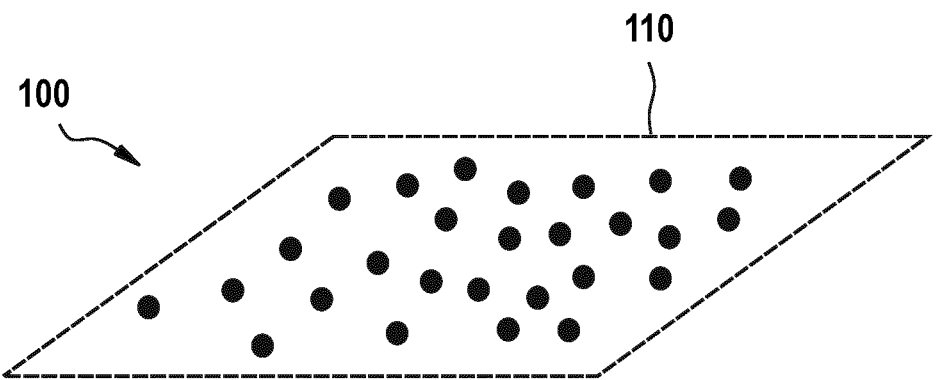
FIGS. 2-4 show examples of the arrangement of a plurality of qubits according to embodiments described herein.
Figure 3:
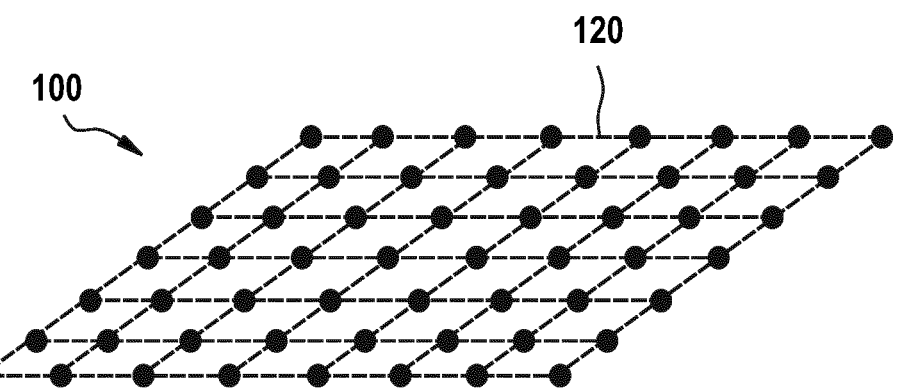
Figure 4:
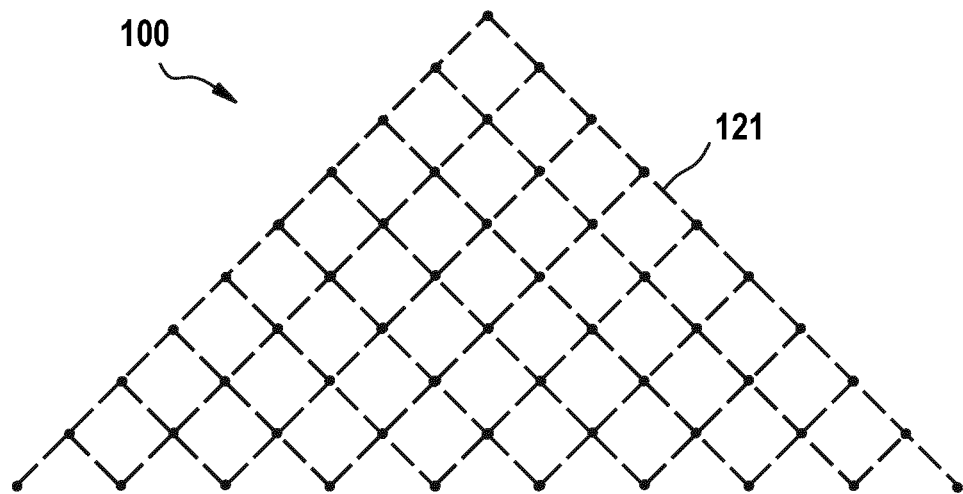

The qubits of the quantum system may be arranged on a 2-dimensional surface or on a 3-dimensional surface, which may be planar or may include curvature. FIGS. 2-4 show different spatial arrangements of the plurality of qubits 100 according to embodiments described herein. These spatial arrangements may be the layouts of quantum computing devices, e.g., quantum chips on which the qubits and/or other individual quantum systems (q-level systems such as qutrits) may be embodied. As shown in FIG. 2, the plurality of qubits 100 may be arranged according to a 2-dimensional planar surface 110, as indicated in FIG. 2 by the dashed lines. It shall be understood that the 2-dimensional surface 110 shown in FIG. 2 is drawn for the purpose of visually representing a 2-dimensional spatial arrangement of the plurality of qubits, but the 2-dimensional surface 110 need not be a physical, tangible surface on which the plurality of qubits 100 are arranged. Similar considerations apply to embodiments according to which the plurality of qubits is arranged according to a 2-dimensional lattice or a 3-dimensional lattice, as described below.

According to further embodiments, and as shown in FIG. 3, the plurality of qubits 100 may be arranged according to a 2-dimensional lattice 120, as indicated by the dashed lines. A lattice, such as e.g. a 2-dimensional lattice or a 3-dimensional lattice, may include a plurality of nodes spatially arranged according to a regular grid. In FIG. 3, the plurality of qubits 100, represented by the plurality of black dots, correspond to the nodes of the 2-dimensional lattice 120. As shown, each qubit of the plurality of qubits 100 may be arranged at a node of the 2-dimensional lattice 120. In the exemplary embodiment shown in FIG. 3, the 2-dimensional lattice 120 is a 2-dimensional square lattice. According to alternative embodiments, the 2-dimensional lattice 120 may, e.g., be a hexagonal lattice or triangular lattice, or any other type of 2-dimensional lattice.

According to embodiments, the plurality of qubits may be arranged according to a 3-dimensional lattice. Similar to the discussion provided in reference to FIG. 3, the plurality of qubits may correspond to the nodes of the 3-dimensional lattice. Each qubit of the plurality of qubits may be arranged at a node of the 3-dimensional lattice. The 3-dimensional lattice may be a 3-dimensional square lattice. As was the case for 2-dimensional lattices, other types of 3-dimensional lattices may also be considered.

A 2-dimensional lattice is a planar structure, which may provide a simpler spatial arrangement of the qubits as compared to, e.g., a 3-dimensional lattice or some irregular spatial arrangement.

According to embodiments, the plurality of qubits may be arranged according to a portion of a 2-dimensional lattice or according to a portion of a 3-dimensional lattice. FIG. 4 illustrates an exemplary embodiment according to which the plurality of qubits 100 is arranged according to a triangular-shaped portion 121 of a 2-dimensional lattice. FIG. 4 shows a top view of the triangular-shaped portion 121. A triangular shaped portion corresponds to the layout of a quantum computing device according to some embodiments which are configured for carrying out the methods described herein. Portions of lattices having a different shape may be considered as well.

The problem Hamiltonian is a single-body Hamiltonian including a plurality of adjustable parameters. A single-body Hamiltonian of the quantum system, as described herein, may refer to a Hamiltonian wherein no interactions occur between groups of two or more qubits. A single-body Hamiltonian may be the sum of a plurality of summand Hamiltonians. Each summand Hamiltonian may act on a single qubit of the plurality of qubits. A single-body Hamiltonian may have the form $H=\Sigma_i H_i$ wherein each $H_i$ is a summand Hamiltonian acting solely on the i-th qubit. A single-body Hamiltonian may represent interactions between the plurality of qubits and an external entity, e.g. a magnetic field or an electric field, wherein each qubit interacts individually with the external entity.

Figure 5:
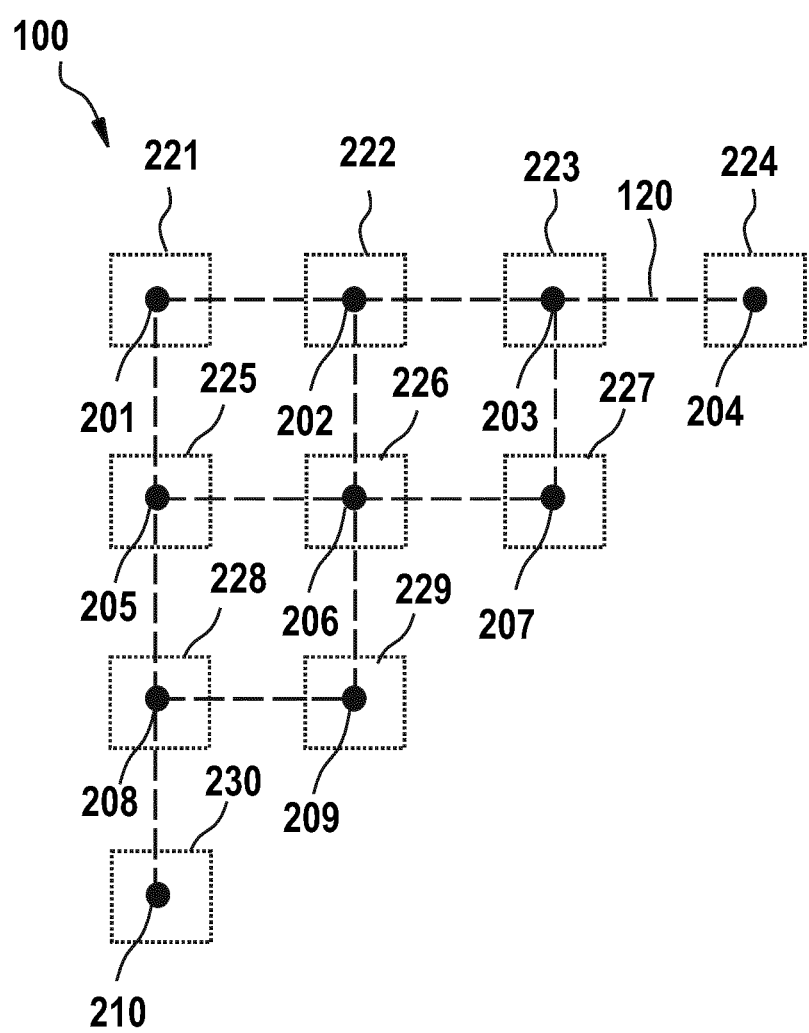
FIG. 5 illustrates the notion of a single-body Hamiltonian according to embodiments described herein.

FIG. 5 shows a schematic illustration of a single-body Hamiltonian according to embodiments described herein. For the sake of concreteness, but without intending to limit the scope, the plurality of qubits shown in FIG. 5 includes 10 qubits, namely qubits 201 through 210, arranged in a portion of a 2-dimensional square lattice that forms a triangle, similar as in FIG. 4. The single-body Hamiltonian described with reference to FIG. 5 is the sum of 10 summand Hamiltonians 221 through 230. In FIG. 5, each of the summand Hamiltonians 221 through 230 is schematically drawn as a square surrounding a single qubit, indicating that each summand Hamiltonian acts on a single qubit. For example, summand Hamiltonian 221 is represented as a square surrounding qubit 201 and qubit 201 alone, indicating that summand Hamiltonian 221 acts on qubit 201 but does not act on any of the remaining qubits 202 to 210.

The problem Hamiltonian, being a single-body Hamiltonian, may be the sum of summand Hamiltonians as described above. The plurality of adjustable parameters of the problem Hamiltonian may include a plurality of adjustable parameters of the summand Hamiltonians. One or more summand Hamiltonians of the single-body Hamiltonian, in particular each of the summand Hamiltonians, may include one or more adjustable parameters.

An adjustable parameter of the problem Hamiltonian, as described herein, may refer to a parameter representing a strength and/or a direction of an interaction between a qubit of the plurality of qubits and an external entity. The external entity may, e.g., include at least one of the following: one or more magnetic fields; one or more electric fields, and/or one or more Laser-fields, Microwaves, or phase shifts from mechanical deformations. Adjusting an adjustable parameter of the problem Hamiltonian may be realized by adjusting the external entity and/or by adjusting the strength and/or type of interaction between the qubit and the external entity. Accordingly, the adjustable parameter may represent an adjustable interaction, e.g. an interaction which is not hard-wired in the quantum system.

According to embodiments, which can be combined with other embodiments described herein, the plurality of adjustable parameters of the problem Hamiltonian may include a plurality of field strengths and/or a plurality of field directions of single-body fields acting on the plurality of qubits. The fields acting on the plurality of qubits may include one or more magnetic fields and/or one or more electric fields, e.g. in embodiments relating to superconducting qubits.

A single-body field may refer to a field influencing a single qubit in the plurality of qubits. According to embodiments, the plurality of single-body fields may include different single-body fields influencing the corresponding qubits according to possibly different field strengths and/or possibly different field directions. For example, a first single-body field and a second single-body field may influence a first qubit and a second qubit, respectively, in the plurality of qubits. Therein the first single body field and the second single-body field, both being e.g. magnetic fields, may have different field strengths and/or field directions.

According to embodiments, which can be combined with other embodiments described herein, the single-body Hamiltonian has the form $\Sigma_k J_k \sigma_z^{(k)}$, wherein $\sigma_z^{(k)}$ is a Pauli operator of a k-th qubit of the plurality of qubits, wherein each $J_k$ is a coefficient, and wherein the coefficients $J_k$ form the plurality of adjustable parameters of the single-body Hamiltonian. According to some embodiments, the Pauli operator $\sigma_z^{(k)}$ may be a Pauli operator associated with a first spatial direction.

For a quantum system including a plurality of superconducting qubits, a single-body Hamiltonian, such as e.g. the problem Hamiltonian, can be realized by a plurality of magnetic fluxes interacting with the plurality of superconducting qubits. A magnetic flux or magnetic flux bias may extend through the primary superconducting loop and through the secondary superconducting loop of a superconducting qubit. The plurality of adjustable parameters of the problem Hamiltonian can be adjusted by adjusting the plurality of magnetic fluxes or magnetic flux biases.

For a quantum system realized with trapped ions, individual ions can be addressed by spatial separation or separation in energy. The case of spatial separation involves using a laser beam that has passed through and/or has been reflected from an acousto-optical deflector, an acousto-optical modulator, micromirror devices, or the like. The case of separation in energy involves using a magnetic field gradient that changes internal transition frequencies, allowing selection through energy differences, i.e., detunings of the applied fields. A single-body Hamiltonian can be realized by laser fields or microwaves resonant or off-resonant with the internal transition or by spatial magnetic field differences.

For a quantum system realized with quantum dots, a single-body Hamiltonian can be realized with electric fields.

For a quantum system realized with NV centers, using magnetic resonance through the application of microwave pulses, qubit states can be coherently manipulated on nanosecond timescales. Selective manipulation of the qubit states can also be achieved conditional on the state of the close-by nuclear spins.

The computational problem may be mapped onto the problem-encoding configuration. The problem-encoding configuration may depend on and/or contain information about the computational problem. The act of determining the problem-encoding configuration may include determining and/or computing a value for each of the plurality of adjustable parameters. Each value may be determined and/or computed from the computational problem.

According to embodiments, different computational problems may be encoded into the problem Hamiltonian by determining corresponding different problem-encoding configurations. For example, a first computational problem and a second computational problem may be encoded into the problem Hamiltonian, leading to a first problem-encoding configuration and a second problem-encoding configuration for the plurality of adjustable parameters. If the second computational problem is different from the first computational problem, the second problem-encoding configuration of the adjustable parameters may be different from the first problem-encoding configuration.

According to embodiments, the method may include providing the computational problem, or at least information regarding the computational problem, to a classical computing system, such as e.g. classical computing system 450 shown in FIG. 1. For example, a plurality of input variables of the computational problem, as described herein, may be provided to the classical computing system. According to embodiments, the computational problem may be encoded in the problem-encoding configuration by the classical computing system. The classical computing system may be configured for computing the problem-encoding configuration from the computational problem, e.g. from a plurality of input variables of the computational problem.

The terminology of a short-range Hamiltonian, as used herein, may refer to a Hamiltonian representing interactions of the plurality of qubits, wherein no interactions occur between qubits which are distanced from each other by a distance greater than an interaction cut-off distance. The interaction cut-off distance may be a constant distance. The interaction cut-off distance may be much smaller compared to a maximal qubit distance between the qubits in the plurality of qubits. For example, the interaction cut-off distance may be 30% or below of the maximal qubit distance, in particular 20% or below, more particularly 10% or below. For a plurality of qubits arranged according to a lattice, the short-range Hamiltonian may be an r-range Hamiltonian, wherein no interactions occur between qubits which are distanced from each other by a distance greater than r times an elementary distance (lattice constant) of the lattice. Therein, r may be from 1 to 5, e.g. $r=\sqrt{2}$, 2, 3, 4 or 5. The notion of an elementary distance of a lattice according to embodiments described herein is illustrated below in reference to e.g. FIGS. 6 and 7.

Irrespective of the number of qubits of the quantum system, a plaquette Hamiltonian and a pairwise nearest-neighbor Hamiltonian of the quantum system, as described herein, shall be regarded as short-range Hamiltonians.

An example of a short-range Hamiltonian is a single-body Hamiltonian, as described herein. For a single-body Hamiltonian, the interaction cut-off distance may be considered to be zero, since there are no interactions between groups of two or more qubits but only interactions between individual qubits and an external entity, e.g. a magnetic field or an electric field.

Figure 6:
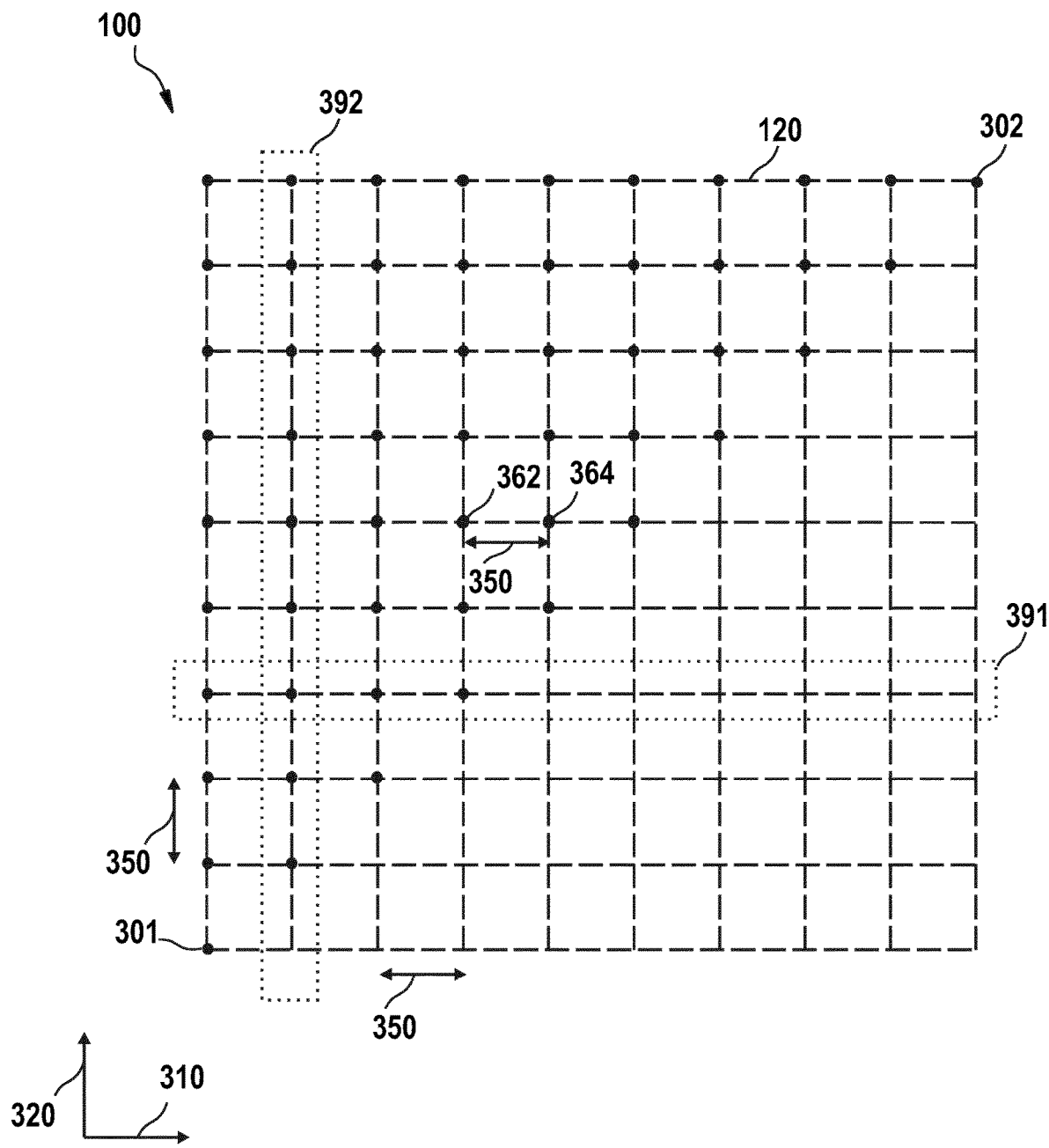
FIGS. 6-7 illustrate the notion of a short-range Hamiltonian according to embodiments described herein.

FIGS. 6 and 7 show further examples of short-range Hamiltonians for embodiments in which the plurality of qubits 100 is arranged according to a 2-dimensional square lattice 120, and lie at positions of nodes of the 2-dimensional square lattice that form a triangle portion of the 2-dimensional square lattice. For the sake of concreteness, but without intending to limit the scope, the exemplary 2-dimensional square lattice 120 shown in FIGS. 6 and 7 includes 55 qubits arranged in a triangle within a square 10×10 lattice comprising 10 rows and 10 columns. When traversing any row of qubits of the 2-dimensional lattice 120 along the x-direction 310, e.g. row 391 as indicated by the dotted lines, the consecutive qubits in the row are arranged at an elementary distance D from each other, which is also called a lattice constant in x-direction. The elementary distance D is indicated with reference numeral 350. Similarly, when traversing any column of qubits of the 2-dimensional lattice 120 along the y-direction 320, e.g. column 392, the consecutive qubits in the column are at an elementary distance, which is also called lattice constant in y-direction. In FIGS. 6 and 7, the lattice a square lattice and the elementary distances (lattice constants) in x-direction and y-direction are the same. However, the lattice constants in x-direction and in y-direction could also be different. As shown, the x-direction 310 is perpendicular to the y-direction 320. The maximal qubit distance of the plurality of qubits 100 shown in FIG. 6 and FIG. 7 is the distance between qubits 301 and 302. The maximal qubit distance is equal to $(9\sqrt{2})D$.

An example of a short-range Hamiltonian described with reference to FIG. 6 is a pairwise nearest-neighbor Hamiltonian. A pairwise nearest-neighbor Hamiltonian may involve only interactions between pairs of neighboring qubits on the 2-dimensional lattice 120, wherein a pair of neighboring qubits may refer to a pair of qubits distanced from each other at the elementary distance D. Qubits 362 and 364 shown in FIG. 6 form an example of a pair of neighboring qubits. A pairwise nearest-neighbor Hamiltonian may be the sum of a plurality of summand Hamiltonians, wherein each summand Hamiltonian represents an interaction between a pair of neighboring qubits. For a pairwise nearest-neighbor Hamiltonian described in reference to FIG. 6, the interaction cut-off distance is equal to the elementary distance D. Accordingly, the interaction cut-off distance is much smaller compared to the maximal qubit distance, namely the interaction cut-off distance D is below 10% of the maximal qubit distance.

An example of a short-range Hamiltonian described with reference to FIG. 7 is a plaquette Hamiltonian. In FIG. 7, 55 qubits shown as black circles are again arranged in a 2-dimensional square lattice 120 and form a triangle therein. A plaquette of the 2-dimensional square lattice 120 is an elementary square of the 2-dimensional square lattice 120, as illustrated in FIG. 7 with reference numeral 370. The plaquette 370 comprises qubits 371, 372, 373 and 374, wherein qubit 371 is arranged at the elementary distance D from qubit 372 and from qubit 374, and wherein qubit 373 is also arranged at the elementary distance D from qubits 372 and 374. Additionally, auxiliary qubits shown with black rectangles are added in a further line so as to complete the plaquettes of the qubits. For instance, auxiliary qubit 305 completes the plaquette of qubits 302, 303 and 304. The auxiliary qubits can be prepared in a specific quantum state, e.g., |1>. For this lattice geometry, a plaquette Hamiltonian may involve only interactions between groups of four qubits, or groups of three qubits and one ancilla qubit, corresponding to plaquettes of the 2-dimensional square lattice 120. A plaquette Hamiltonian may be the sum of a plurality of summand Hamiltonians. Each summand Hamiltonian may represent an interaction corresponding to a plaquette of qubits on the lattice, or an interaction corresponding to a plaquette of qubits and an auxiliary qubit. Alternatively, no auxiliary qubits may be used, and the plaquette Hamiltonian then includes summand Hamiltonians describing interactions between only three qubits. For a plaquette Hamiltonian described with reference to FIG. 7, the interaction cut-off distance is $\sqrt{2}D$ since the maximal distance between two qubits in a plaquette is $\sqrt{2}D$. For example, the distance between qubits 371 and 373 is $\sqrt{2}D$. Accordingly, the interaction cut-off distance is much smaller compared to the maximal qubit distance, namely the interaction cut-off distance $\sqrt{2}D$ is below 12% of the maximal qubit distance.

For a quantum system including a plurality of superconducting qubits, a plaquette Hamiltonian can be realized using a plurality of ancillary qubits, wherein an ancillary qubit may be arranged inside each plaquette, e.g. at the center of each plaquette. Interactions between qubits of the form $K_{km}\sigma_z^{(k)}\sigma_z^{(m)}$ can be realized by a coupling unit, e.g. an inductive coupling unit, as described herein. The coupling unit includes a superconducting quantum interference device. Applying an adjustable magnetic flux bias to the superconducting quantum interference device allows tuning the coefficient $K_{km}$. A summand Hamiltonian of the plaquette Hamiltonian can then be realized by $H_{sr,p}=C(\sigma_z^{(1)}+\sigma_z^{(2)}+\sigma_z^{(3)}+\sigma_z^{(4)}-2\sigma_z^{(p)}-1)^2$, which includes only pairwise interactions of the form $\sigma_z^{(k)}\sigma_z^{(m)}$ and single-body $\sigma_z^{(l)}$ terms corresponding to imposed energy differences between the |0> and |1> quantum basis states. Here, $\sigma_z^{(p)}$ represents the ancilla qubit. The short-range Hamiltonian is a sum of the summand Hamiltonians $H_{sr,p}$. For embodiments involving ancillary qubits, a single-body Hamiltonian of the form $h\Sigma_p\sigma_x^{(p)}$ for the plurality of ancillary qubits is added to the initial Hamiltonian.

Alternatively, a plaquette Hamiltonian can be realized without ancillary qubits, e.g., using three-island superconducting devices as transmon qubits. By integrating two additional superconducting quantum interference devices in the coupling unit and by coupling the four qubits of a plaquette capacitively to a coplanar resonator, a summand Hamiltonian of the form $-C\sigma_z^{(1)}\sigma_z^{(2)}\sigma_z^{(3)}\sigma_z^{(4)}$ can be realized. The coupling coefficient C can be tuned by time-dependent magnetic flux biases through the two additional superconducting quantum interference devices.

For a quantum system realized with trapped ions, interactions between two ions are transmitted via a phonon bus. For this, lasers or microwaves are used that are detuned with respect to the blue- and/or red-side band transition of the phonons. The strength of the laser and detuning allow one to adjust the interaction strength. Direct interactions through Rydberg excitations can also be used.

For a quantum system realized with cold atoms, interactions between qubits can be controlled by detuning of a laser that laser excites d atoms. In this case, the Hamiltonian is a d-body Hamiltonian. Plaquette Hamiltonians may either be implemented from d-body interactions or from ancillary qubits with two-body interactions.

For a quantum system realized with quantum dots, an interaction between two qubits is regulated by an electric field gradient and a magnetic field. A short range Hamiltonian can be realized with pulse sequences and magnetic fields. A plaquette Hamiltonian may be realized by using an additional ancillary qubit with the short range Hamiltonian acting on all pairs of the plaquette.

For a quantum system realized with NV centers, interactions between NV centers can be transmitted by coupling them to light fields.

According to embodiments, which can be combined with other embodiments described herein, the plurality of qubits may be arranged according to a 2-dimensional lattice. The short-range Hamiltonian may involve interactions between groups of four qubits corresponding to plaquettes of the 2-dimensional lattice. According to embodiments, the short-range Hamiltonian may be a plaquette Hamiltonian, as described herein.

According to some embodiments, which can be combined with other embodiments described herein, the short-range Hamiltonian is a d-body Hamiltonian, wherein d may be 2, 3, 4, 5, 6, 7 or 8. A d-body Hamiltonian, as described herein, may refer to a Hamiltonian representing interactions of the plurality of qubits, wherein no joint interactions occur between groups comprising d+1 or more qubits. A d-body Hamiltonian may involve interactions between groups comprising d or less qubits. A d-body Hamiltonian may be the sum of a plurality of summand Hamiltonians, wherein each summand Hamiltonian represents a joint interaction between a group of d qubits or less.

For example, a single-body Hamiltonian, as described herein, may be considered as a d-body Hamiltonian with d=1. As a further example, a pairwise nearest-neighbor Hamiltonian, as described herein, may be regarded as a d-body Hamiltonian with d=2. As a yet further example, a plaquette Hamiltonian, as described herein, may be regarded as a d-body Hamiltonian with d=4. According to embodiments, which can be combined with other embodiments described herein, the short-range Hamiltonian may be a d-body Hamiltonian, wherein d=4. The value of d may depend on the geometry of the lattice. For instance, for a hexagonal lattice, a plaquette would involve six qubits, and a plaquette Hamiltonian could be a 6-body Hamiltonian.

It is advantageous to have a short-range Hamiltonian which is a d-body Hamiltonian with small d, e.g. d=4, since the corresponding interactions between the qubits can be engineered more easily compared to d-body Hamiltonians with larger d.

The size of a computational problem, as described herein, may refer to a measure for the number of classical information units required to specify the computational problem. The size of a computational problem may depend on the number of input variables of the computational problem. The size of a computational problem may increase as the number of input variables increases. The size of the computational problem may be equal to the number of input variables. For example, for the traveling salesman problem, as described herein, the size may refer to the sum of the lengths of the first list and the second list. As a further example, for the Ising spin model problem, the size may refer to the number n of spins $s_i$.

For a first computational problem having a first size, the corresponding final Hamiltonian may be the sum of a first problem Hamiltonian and a first short-range Hamiltonian. For a second computational problem having a second size, the corresponding final Hamiltonian may be the sum of a second problem Hamiltonian and a second short-range Hamiltonian. If the second size is the same as the first size, the second short-range Hamiltonian may be the same as the first short-range Hamiltonian. If the second size is different from the first size, the second short range Hamiltonian may be different from the first short-range Hamiltonian. For example, in reference to the Ising spin model described above, the first computational problem may refer to a first Ising spin model problem for N spins with a first set of coupling coefficients and field coefficients, and the second computational problem may refer to a second Ising spin model problem, also for N spins, with a second set of coupling coefficients and field coefficients different from the first set of coupling coefficients and field coefficients. Therein, the sizes of the first and second Ising spin model problem may both be considered to be equal to the number N. According to embodiments, the short-range Hamiltonian for the first Ising spin model problem is the same as the short-range Hamiltonian for the second Ising spin model problem.

According to embodiments, which can be combined with other embodiments described herein, the short-range Hamiltonian may be a d-body Hamiltonian, wherein d may be independent of the computational problem. Further, the interaction cut-off distance may be independent of the computational problem. According to embodiments, which can be combined with other embodiments described herein, the short-range Hamiltonian may be independent of the computational problem.

According to embodiments described herein, the method includes evolving the quantum system from the initial quantum state towards the ground state of the final Hamiltonian. The ground state of the final Hamiltonian is a quantum state of the quantum system minimizing the energy for the final Hamiltonian. The ground state of the final Hamiltonian is an eigenstate of the final Hamiltonian, in particular an eigenstate with minimal eigenvalue. Since the computational problem is encoded in the problem Hamiltonian and since the final Hamiltonian is the sum of the problem Hamiltonian and the short-range Hamiltonian, the ground state of the final Hamiltonian contains information about the computational problem and/or may encode a solution of the computational problem.

The ground state of the final Hamiltonian may be a state of the quantum system at zero temperature. Not wishing to be bound by any particular theory, according to considerations in the field of quantum physics, it is considered impossible for a quantum system to reach a temperature of absolute zero. Still, evolving the quantum system from the initial quantum state towards the ground state of the final Hamiltonian, including e.g. cooling the quantum system to an operating temperature $T_{max}$, may allow approaching the ground state of the final Hamiltonian. The operating temperature $T_{max}$ may depend strongly on the type of qubits used in the quantum system. E.g. for superconducting qubits, $T_{max}$ may be 50 mK or below, preferably 1 mK or below. The quantum system may be evolved from the initial quantum state to a final quantum state of the quantum system to approach the ground state of the final Hamiltonian. The final quantum state may be a state of the quantum system at the operating temperature $T_{max}$ or at a lower temperature, i.e. it may be a thermal state of the final Hamiltonian at the operating temperature or at a lower temperature. Accordingly, the final quantum state may approximate the ground state of the final Hamiltonian. The final quantum state may contain information about the ground state of the final Hamiltonian. The final quantum state may contain information about the solution to the computational problem.

The quantum system may be a cooled, e.g. by a cooling unit as described herein, to the operating temperature $T_{max}$ or to a lower temperature. The operating temperature may be a non-zero temperature.

According to embodiments, which be combined with other embodiments described herein, the method may include initializing the quantum system in an initial quantum state by cooling the quantum system towards a ground state of an initial Hamiltonian. The ground state of the initial Hamiltonian is a quantum state of the quantum system minimizing the energy for the initial Hamiltonian. The ground state of the initial Hamiltonian is an eigenstate of the initial Hamiltonian, in particular an eigenstate with minimal eigenvalue. The ground state of the initial Hamiltonian is a state of the quantum system at zero temperature. Cooling the quantum system towards the ground state of the initial Hamiltonian may allow for approaching the ground state of the initial Hamiltonian. The initial quantum state may approximate the ground state of the initial Hamiltonian.

The initial Hamiltonian may be independent of the computational problem. The initial Hamiltonian may be a d-body Hamiltonian with d being 1, 2, 3 or 4. The initial Hamiltonian may be a single-body Hamiltonian, as described herein. Having an initial Hamiltonian which is a single-body Hamiltonian allows for a simple set-up to realize the initial Hamiltonian, e.g. for a quantum system of superconducting qubits.

The initial Hamiltonian may be a single-body Hamiltonian having the form $H^{init}=\Sigma_k a_k \sigma_x^{(k)}$. Therein, $a_k$ may be a coefficient for a k-th qubit in the plurality of qubits and $\sigma_x^{(k)}$ may be Pauli operator acting on the k-th qubit. In particular, $\sigma_x^{(k)}$ may be a Pauli operator corresponding to a second spatial direction. The second spatial direction may be orthogonal to the first spatial direction as described herein. The Pauli operator $\sigma_x^{(k)}$ and the Pauli operator $\sigma_z^{(k)}$ may be non-commuting, in particular anti-commuting, operators. According to embodiments, each of the coefficients $a_k$ is equal to a single common coefficient h. The initial Hamiltonian may be a single-body Hamiltonian having the form $H^{init}=h \Sigma_k \sigma_x^{(k)}$.

For a superconducting qubit, a magnetic flux bias through the primary superconducting loop of the superconducting qubit may be set such that the basis states |0> and |1> have the same energy, i.e. the energy difference for these basis states is zero. Further, a magnetic flux bias through the secondary superconducting loop can couple the basis states |0> and |1>. Accordingly, a summand Hamiltonian of the form $h\sigma_x^{(k)}$ can be realized for the superconducting qubit. Accordingly, an initial Hamiltonian of the form $H^{init}=h \Sigma_k \sigma_x^{(k)}$ can be realized for a plurality of superconducting qubits. A ground state of the initial Hamiltonian can be occupied with near certainty by setting the coefficient h to a value which is much larger than the energy scale determined by the temperature of the quantum system.

For a quantum system realized with trapped ions, the ions can be initialized by optical pumping using a laser, which deterministically transfers the ions into one the two quantum basis states of a qubit. This reduces entropy and is therefore a cooling on the internal states.

For a quantum system realized with cold atoms, the initial quantum state may be prepared by exciting atoms being in their ground state to a Rydberg state with a large detuning.

For a quantum system realized with NV Centers, the NV Centers may be addressed individually by using standard optical confocal microscopy techniques. Initialization and measurement can be performed by off-resonant or resonant optical excitation.

According to embodiments, the quantum system is evolved from the initial quantum state towards a ground state of the final Hamiltonian. According to embodiments, evolving the quantum system may include performing quantum annealing. Quantum annealing may be performed by a programmable quantum annealing unit, as described herein.

Performing quantum annealing may include passing from the initial Hamiltonian of the quantum system to the final Hamiltonian. Performing quantum annealing may include passing from the initial Hamiltonian to the final Hamiltonian via an interpolation Hamiltonian. The interpolation Hamiltonian may be a time-dependent Hamiltonian. The interpolation Hamiltonian may have one or more interpolation parameters for interpolating between the initial Hamiltonian and the final Hamiltonian. For example, the interpolation Hamiltonian may have the form $H(t)=A(t) H^{init}+B(t) H^{final}$. Therein, $H^{init}$ may refer to the initial Hamiltonian, $H^{final}$ may refer to the final Hamiltonian, t may be a time parameter, and A(t) and B(t) may be interpolation coefficients depending on the time parameter t.

Performing quantum annealing may include passing from the initial Hamiltonian at an initial time to the final Hamiltonian at a final time. At the initial time, one or more interpolation parameters of the interpolation Hamiltonian may be set to one or more respective initial values. At the initial time, the interpolation Hamiltonian may be equal to the initial Hamiltonian. For example, in an embodiment in which the interpolation Hamiltonian has the form $H(t)=A(t) H^{init}+B(t) H^{final}$, the interpolation parameter A(t) may be set to the initial value 1 at the initial time and the interpolation parameter B(t) may be set to the initial value 0 at the initial time. Accordingly, the interpolation Hamiltonian is equal to $H^{init}$ at the initial time.

Performing quantum annealing may include gradually passing from the initial Hamiltonian to the final Hamiltonian. Performing quantum annealing may include gradually changing the one or more interpolation parameters of the interpolation Hamiltonian. At intermediate times between the initial time and the final time, the interpolation Hamiltonian is different from the initial Hamiltonian and/or from the final Hamiltonian. An interpolation parameter of the interpolation Hamiltonian may be gradually changed from an initial value, e.g. at the initial time, to a final value, e.g. at the final time. At the final time, the interpolation Hamiltonian is equal to the final Hamiltonian. For example, for embodiments according to which the interpolation Hamiltonian has the form $H(t)=A(t) H^{init}+B(t) H^{final}$, the interpolation parameter A(t) may be gradually changed from the initial value 1 at the initial time to the final value 0 at the final time. Similarly, the interpolation parameter B(t) may be gradually changed from the initial value 0 at the initial time to the final value 1 at the final time. Accordingly, the interpolation Hamiltonian H(t) is equal to the final Hamiltonian at the final time.

According to embodiments, which can be combined with other embodiments described herein, the quantum system is maintained at an operating temperature of 50 mK or below, in particular 1 mK or below while the quantum annealing is performed.

According to embodiments, which can be combined with other embodiments described herein, performing quantum annealing from the initial Hamiltonian to the final Hamiltonian includes adiabatically evolving the initial Hamiltonian into the final Hamiltonian.

For a quantum system including a plurality of superconducting qubits with an initial Hamiltonian of the form $h\Sigma_k \sigma_x^{(k)}$, a problem Hamiltonian of the form $\Sigma_k J_k \sigma_z^{(k)}$ and a short-range Hamiltonian of the form $C\Sigma_l C_l$ with the summand Hamiltonians $C_l$ corresponding to plaquettes, quantum annealing can be performed as follows. After initialization, where $C=J_k=0$, one slowly increases C and $J_k$ while slowly reducing the coefficient a until a=0.

Alternative to, or in addition to, embodiments involving quantum annealing, evolving the quantum system from the initial quantum state towards the ground state of the final Hamiltonian may include cooling the quantum system from the initial quantum state to the final quantum state. The initial quantum state may be a state of the quantum system at an initial temperature. The final quantum state may be a state of the quantum system at a final temperature. The final temperature is lower than the initial temperature. Cooling the quantum system from the initial quantum state at the initial temperature to the final quantum state at the final temperature may include decreasing, e.g. gradually decreasing, the temperature from the initial temperature to the final temperature. According to embodiments, which can be combined with other embodiments described herein, the final temperature may be 50 mK or below, in particular 1 mK or below. According to embodiments, which can be combined with other embodiments described herein, the initial temperature may be room temperature or below, in particular 200 Kelvin or below.

According to embodiments, the method includes measuring at least a portion of the plurality of qubits to obtain a read-out of the final quantum state. According to some embodiments, a portion of the plurality of qubits is measured, so that not all qubits in the plurality of qubits are measured. The portion of the plurality of qubits may comprise 70% or less of the plurality of qubits, in particular 60% or less, more particularly 50% or less. According to some embodiments, if the total number of qubits in the plurality of qubits is denoted by N, then the number of qubits in the portion scales according to $\sqrt{N}$.

Measuring the at least a portion of the plurality of qubits may include measuring each qubit in the at least a portion individually. Measuring the at least a portion may include measuring a Pauli operator, e.g. the Pauli operator $\sigma_z$, for each of the qubits in the at least a portion of the qubits. Measuring the at least a portion may include performing a two-outcome measurement for each qubit in the at least a portion of the plurality of qubits. A two-outcome measurement may provide one of two possible outcomes, e.g. 0 or 1. The at least a portion of qubits may be measured by a measurement apparatus, as described herein.

Measuring the at least a portion may provide the readout of the final quantum state. The read-out may have the form of classical information, represented by a plurality of classical bits. The read-out may reveal information about the final quantum state and/or about the ground state of the final Hamiltonian. The read-out may provide information about a solution, e.g. a trial solution, a true solution or a set of witness variables, to the computational problem. The read-out may be a solution to the computational problem.

For a quantum system including a plurality of N superconducting qubits, the qubit states $|0\rangle$ and $|1\rangle$ for the plurality of qubits can be measured with high fidelity using a measurement device including a plurality of superconducting quantum interference devices, in particular N hysteretic DC superconducting quantum interference devices and N RF superconducting quantum interference device latches controlled by bias lines, wherein the number of bias lines scales according to $\sqrt{N}$.

For a quantum system realized with trapped ions, a measurement of the quantum system can be performed by fluorescence spectroscopy. Therein, ions are driven on a transition with short lifetime if they are in one of the two spin states. As a result, the ions in the driven state emit many photons, while the other ions remain dark. The emitted photons can be registered by commercial CCD cameras. Measurement in any of the directions on the Bloch sphere is achieved by appropriate single-qubit pulses prior to the fluorescence spectroscopy.

For a quantum system realized with cold atoms, the qubits can be measured by performing a selective sweep of ground state atoms and fluorescence imaging with single site resolutions.

For a quantum system realized with quantum dots, the qubits can be read out from a pulse sequence by rapid adiabatic passage.

According to embodiments, the method includes determining a solution to the computational problem from the read-out. The method may include computing the solution from the read-out. The read-out may be provided to a classical computing system, as described herein. The classical computing system may determine or compute the solution to the computational problem from the read-out.

The computational problem, as described herein, may relate to the complexity class NP considered in the field of computer science, wherein "NP" stands for "nondeterministic polynomial time". According to embodiments, which can be combined with other embodiments described herein, the computational problem belongs to the complexity class NP. The complexity class NP comprises decision problems. Informally speaking, for a computational problem belonging to the complexity class NP, there exists a set of witness variables on the basis of which it is possible to verify that the solution to the computational problem is "yes". Therein, for computational problems in NP, the process of verifying that the solution is "yes" can be carried out by a verification algorithm having a runtime which scales only polynomially with the size of the computational problem. In other words, the set of witness variables contains information about the solution, wherein the information may processed in polynomial runtime by the verification algorithm to verify that the solution is "yes. For a formal definition of the complexity class NP, reference is made to the relevant computer science literature.

For example, the traveling salesman problem, the 3-colorability problem and the Ising spin model problem, as described herein, are examples of decision problems in the complexity class NP. For example, consider the Ising spin model problem. If the solution to the Ising spin model problem for a given set of coupling coefficients and field coefficients and for a given constant K is "yes", then a configuration of spins $(s_1, s_2, \ldots, s_n)$ for which the associated Ising energy function $H(s_1, s_2, \ldots, s_n)$ is smaller than K may be regarded as a set of witness variables. Given the witness variables $(s_1, s_2, \ldots, s_n)$, it may be verified in polynomial time that the energy $H(s_1, s_2, \ldots, s_n)$ is indeed smaller than K, by computing the number $H(s_1, s_2, \ldots, s_n)$ and comparing it with K. Accordingly, the Ising spin model problem is contained in the complexity class NP.

The task of determining whether a solution, which is "yes" or "no" for a decision problem, may not have a polynomial time algorithm for some computational problems in NP or may even have an exponential runtime, whereas the verification algorithm may have a polynomial runtime. It is considered that some computational problems in the complexity class NP are computationally intractable for classical computing systems. Therein, the terminology of a "computationally intractable" computational problem may refer to a computational problem for which there does not exist an algorithm, running on a classical computing system with polynomial runtime, to determine whether the solution to the computational problem is "yes" or "no". In particular, the traveling salesman problem, the 3-colorability problem and the Ising spin model problem, are considered intractable for classical computing systems, or at least no algorithm is known to solve any of these problems in polynomial runtime.

According to embodiments, which can be combined with other embodiments described herein, the computational problem for which a solution is computed using the quantum system, as described herein, is an NP-complete problem or an NP-hard problem. NP-complete problems belong to the class NP and are considered computationally intractable for classical computing systems. Although not every NP-hard problem belongs to NP, NP-hard problems are also considered to be computationally intractable for classical computing systems.

For embodiments according to which the computational belongs to the complexity class NP, e.g. NP-complete problems, the read-out of the measurement may include a set of witness variables of the computational problem or at least a portion of this set.

According to some embodiments, which can be combined with other embodiments described herein, determining the problem-encoding configuration may include mapping the computational problem onto an auxiliary computational problem, wherein the auxiliary computational problem includes determining a ground state of a long-range spin model. The auxiliary computational problem depends on the computational problem. Mapping the computational problem onto the auxiliary computational problem may include mapping input parameters of the computational problem onto input parameters of the auxiliary computational problem. The mapping of the computational problem onto the auxiliary problem may be such that a solution for the computational problem may be determined from a solution to the auxiliary computational problem.

According to embodiments, the auxiliary computational problem may refer to the Ising spin model problem, as described herein. According to further embodiments, the computational problem may be a problem in the complexity class NP, e.g., the traveling salesman problem, as described herein. Since the Ising spin model problem is an NP-complete problem, every problem in the complexity class NP, such as e.g., the traveling salesman problem, may be mapped onto the Ising spin model problem. For example, for the traveling salesman problem including a first list and a second list, as described herein, the first list and the second list may be mapped onto a set of coupling coefficients and field coefficients, as described herein, for the Ising spin model problem. A solution for the traveling salesman problem may be computed from a solution for the Ising spin model problem with the corresponding coupling coefficients and field coefficients. Such mappings are known.

According to embodiments, determining the problem-encoding configuration may include determining the problem-encoding configuration from the long-range spin model, e.g. from an Ising spin model. A specific way to perform this determination is described in more detail with respect to FIGS. 9-16.

According to embodiments, which can be combined with other embodiments described herein, the long-range spin model may be a long-range spin model with m-body interactions, wherein m is 1, 2 or 3.

According to embodiments, which can be combined with other embodiments described herein, the method further includes determining the short-range Hamiltonian from a plurality of closed loops of spins in the long-range spin model.

According to a further embodiment, a method of computing a solution to the computational problem using the quantum system comprising the plurality of qubits is provided.

The method includes encoding the computational problem into the problem Hamiltonian of the quantum system, as described herein. The problem Hamiltonian is a single-body Hamiltonian including the plurality of adjustable parameters, as described herein. The encoding includes determining, from the computational problem, the problem-encoding configuration for the plurality of adjustable parameters, as described herein.

The method further includes initializing the quantum system in an initial quantum state. The method further includes evolving the quantum system from the initial quantum state to a final quantum state by performing quantum annealing. Performing quantum annealing includes passing from an initial Hamiltonian of the quantum system to a final Hamiltonian of the quantum system, as described herein. The final Hamiltonian is the sum of the problem Hamiltonian and the short-range Hamiltonian, as described herein, wherein the plurality of adjustable parameters of the problem Hamiltonian are in the problem-encoding configuration and wherein the short-range Hamiltonian is a d-body Hamiltonian, wherein d is independent of the computational problem.

The method further includes measuring the at least a portion of the plurality of qubits to obtain a read-out of the final quantum state, as described herein.

The method further includes determining a solution to the computational problem from the read-out, as described herein.

According to a further embodiment, an apparatus for computing solutions to computational problems, such as e.g. apparatus 400 shown in FIG. 1, is provided.

The apparatus includes a quantum system comprising a plurality of qubits, as described herein.

The apparatus further includes a cooling unit, such as e.g. cooling unit 410 shown in FIG. 1, adapted for cooling the quantum system towards a ground state of the quantum system, as described herein. The cooling unit may be configured for cooling the quantum system towards a ground state of the initial Hamiltonian, as described herein, to initialize the quantum system in the initial quantum state, as described herein. The cooling unit may be configured for maintaining the quantum system at an operating temperature which strongly depends on the type of qubits used in the apparatus. E.g., for superconducting qubits, the operating temperature is 50 mK or below, in particular 1 mK or below.

The apparatus further includes a programmable quantum annealing unit, such as e.g. programmable quantum annealing unit 430 shown in FIG. 1, adapted for evolving, by quantum annealing, the initial Hamiltonian of the quantum system into the final Hamiltonian of the quantum system, as described herein. The final Hamiltonian is the sum of the problem Hamiltonian and the short-range Hamiltonian, as described herein.

The cooling unit may be configured for maintaining the quantum system at the operating temperature during performing of quantum annealing by the programmable quantum annealing unit.

The apparatus further includes a measurement device, such as e.g. measurement device 440 shown in FIG. 1, adapted for measuring at least a portion of the plurality of qubits.

The apparatus further includes a classical computing system, such as e.g. classical computing system 450 shown in FIG. 1, connected to the programmable quantum annealing unit and to the measurement device. The classical computing system may be configured for receiving, as an input, a computational problem. The classical computing system may further be configured for encoding the computational problem into the problem Hamiltonian. Therein, the encoding may include determining, from the computational problem, the problem-encoding configuration for the plurality of adjustable parameters of the problem Hamiltonian, as described herein. The classical computing system may further be configured for communicating the problem-encoding configuration to the quantum annealing unit.

The programmable quantum annealing unit may be configured for receiving the problem-encoding configuration from the classical computing system. The programmable quantum annealing unit may be configured for passing, by quantum annealing, from the initial Hamiltonian into the final Hamiltonian, wherein the plurality of adjustable parameters of the problem Hamiltonian are in the problem-encoding configuration.

The classical computing system may further be configured for receiving a read-out of the quantum system from the measurement device. The classical computing system may further be configured for determining a solution to the computational problem from the read-out.

According to a further embodiment, a programmable quantum annealing device for computing solutions to computational problems is provided. The programmable quantum annealing device includes a quantum system including a plurality of superconducting qubits arranged according to a two-dimensional lattice.

The programmable quantum annealing device further includes a magnetic flux bias assembly including a plurality of magnetic flux bias units configured for generating a plurality of adjustable magnetic fluxes. Each adjustable magnetic flux acts on a single superconducting qubit in the plurality of superconducting qubits.

The programmable quantum annealing device further includes a coupling unit including at least one superconducting quantum interference device configured for coupling the plurality of superconducting qubits according to a plaquette Hamiltonian.

The programmable quantum annealing device further includes a controller connected to the magnetic flux bias unit and to the coupling unit. The controller is configured for receiving a problem-encoding configuration for a plurality of adjustable parameters of a problem Hamiltonian of the quantum system, wherein the problem Hamiltonian is a single-body Hamiltonian and wherein the problem-encoding configuration encodes a computational problem. The controller is further configured for controlling the magnetic flux bias assembly and the coupling unit to evolve an initial Hamiltonian of the quantum system into a final Hamiltonian of the quantum system by quantum annealing. The final Hamiltonian is the sum of the plaquette Hamiltonian and the problem Hamiltonian, wherein the plurality of adjustable parameters of the problem Hamiltonian are in the problem-encoding configuration.

The terminology of a "programmable quantum annealing unit" is used synonymously to the terminology of a "programmable quantum annealing device" herein.

Further aspects of the present disclosure are described with respect to FIGS. 9-16. A specific encoding of a computational problem into a problem Hamiltonian and the corresponding final Hamiltonian are described, namely an encoding of an Ising spin model problem with long-range interactions into a final quantum Hamiltonian being the sum of a single-body problem Hamiltonian and a plaquette Hamiltonian. The (classical) Ising spin model problem with long-range interactions is NP-complete, and its quantization is trivial so that no distinction between the classical and quantum Ising spin model will be made herein. Mappings of other classical computational problems to the Ising spin model problem are known. The ground state of the final quantum Hamiltonian, or a thermal state at low operating temperature, can therefore contain information about a solution of the Ising spin model problem, and, by inverse mapping, of many classical NP-hard computational problems. The specific mapping to the final quantum Hamiltonian allows a realization of a quantum processing device (quantum processor) in a 2-dimensional surface, specifically a 2-dimensional lattice, if the Ising spin model problem includes only d-body interactions with d smaller or equal to two, and allows a realization of the quantum processing device in a 3-dimensional space, specifically in a 3-dimensional lattice, if the Ising spin model problem includes only d-body interactions with d smaller or equal to three. The mapping can be extended to Ising spin model problems with d-body interactions and arbitrary d. The quantum processing devices are fully programmable through the single-body problem Hamiltonian, and are scalable architectures.

The case of the Ising spin model problem which includes only d-body interactions with d smaller or equal to two is considered first. The specific encoding starts from the Ising spin model problem for n spins, as described herein, with at most two-body interactions and corresponding coupling coefficients $c_{ij}$. The indices i and j may range from 1 to n with j being smaller than i. In a first case, all field coefficients $c_i$ are equal to zero. FIG. 9 illustrates an Ising spin model problem for n=6 spins, wherein the spins are labeled from 1 to 6. There are n(n−1)/2=15 pairwise interactions between the spins, as indicated in FIG. 9 by the lines connecting pairs of spins. For example, the line indicated with 12 represents a pairwise interaction between the spins 1 and 2. The 15 pairwise interactions correspond to 15 coupling coefficients $c_{ij}$. The interactions are long-range interactions.

For every pair of spins in the Ising spin model, a corresponding qubit in the quantum system is provided. For example, for the 6 spins with 15 pairwise interactions shown in FIG. 9, the corresponding quantum system includes 15 qubits. A configuration of spins in the Ising spin model is mapped to a configuration of the corresponding qubits. Therein, the configuration of the qubits depends on a relative orientation of the spins. A pair of spins pointing in the same direction (parallel alignment) are mapped to a qubit in the quantum basis state "|1>". Further, a pair of spins pointing in opposite directions (antiparallel alignment) are mapped to a qubit in the quantum basis state "|0>". This mapping is illustrated in FIG. 10. In FIG. 10, the labels 0 and 1 correspond to the quantum basis states |0> and |1>, respectively.

The coupling coefficients $c_{ij}$ are mapped to a plurality of adjustable parameters $J_k$ of a problem Hamiltonian encoding the computational problem, in this case the Ising spin model problem. The problem Hamiltonian has the form $\Sigma_k J_k \sigma_z^{(k)}$, wherein k=n*i+j and wherein k ranges from 1 to M with M=n(n−1)/2. The Ising spin model problem is mapped to the problem Hamiltonian in such a way that the adjustable parameters $J_k$ of the problem Hamiltonian represent the interactions between the spins in the Ising spin model, corresponding to the coupling coefficients $c_{ij}$.

The number of qubits needed for encoding the Ising spin model problem in the problem Hamiltonian increases quadratically compared to the Ising spin model problem for n spins, because the number of two-body interactions between the spins is equal to M=n(n−1)/2. According to some embodiments, additional degrees of freedom may be considered. The total number of qubits in the quantum system may be M+n−2 or more, wherein n−2 additional ancillary qubits and/or additional auxiliary qubits may be added for reasons explained below. Accordingly, the number of qubits may be greater than the number of spins n. In particular, the number of qubits may be the number of spins n plus M−2 additional degrees of freedom. The problem Hamiltonian allows a programming of the quantum processing device with only local interactions, in particular single-body interactions with external fields.

The increased number of degrees of freedom of the quantum system compared to the Ising spin model is compensated by a short-range Hamiltonian which is the sum of M−n 4-body summand Hamiltonians $C_l$, called constraint Hamiltonians representing constraints for fixing a portion of the qubits. The short-range Hamiltonian has the form $\Sigma_l C_l$, wherein the index l ranges from 1 to $(n^2-3n)/2$ and wherein each summand Hamiltonian $C_l$ is a constraint Hamiltonian which may have the form $$C_l = -C\left(\sum_{m=n,e,s,w} \tilde{\sigma}_z^{(l,m)} + S_z^l\right)^2$$
$$= -C\tilde{\sigma}_z^{(l,n)}\tilde{\sigma}_z^{(l,e)}\tilde{\sigma}_z^{(l,s)}\tilde{\sigma}_z^{(l,w)}.$$

In reference to the above equation, two possible implementations of the constraint Hamiltonians may be considered. The sum in the above equation may represent an ancilla-based implementation. The sum runs over the four members of a plaquette (north, east, south, west) of a 2-dimensional lattice according to which the qubits are arranged. Further, each $S_z^l$ is an operator acting on an ancillary qutrit included in the quantum system. An ancillary qutrit has a basis consisting of three basis states which, in this embodiment, will be labeled |0>, |2>, and |4>. The second implementation of the short-range Hamiltonians is an interaction-based implementation that does not require ancillary qutrits. According to the interaction-based implementation, $C_l$ is a four-body interaction between qubits forming a plaquette of the lattice. Further, in the above equation, C represents a constraint strength, e.g. a constant constraint strength.

As described above, the encoding of the Ising spin model in the problem Hamiltonian involves mapping configurations of spins of the Ising spin model onto configurations of qubits in the quantum system, wherein a configuration of qubits depends on the relative orientation of pairs of spins in the corresponding configuration of spins. To provide a consistent mapping, aspects relating to closed loops in the Ising spin model are taken into account, as discussed in the following. In each closed loop of spins in the Ising spin model, the number of pairs of spins having an anti-parallel alignment is an even number. For example, with reference to FIG. 9, consider e.g. the closed loop formed by the connections 14, 24, 23 and 13 as indicated by the dashed lines. The closed loop includes the spins 1, 2, 3 and 4. Any configuration of the spins 1, 2, 3 and 4 includes zero, two or four pairs of anti-parallel spins. No configuration of the spins 1, 2 3 and 4 has one or three pairs of anti-parallel spins. Accordingly, every configuration of the spins 1, 2, 3 and 4 has an even number of anti-parallel spins.

Figure 11:
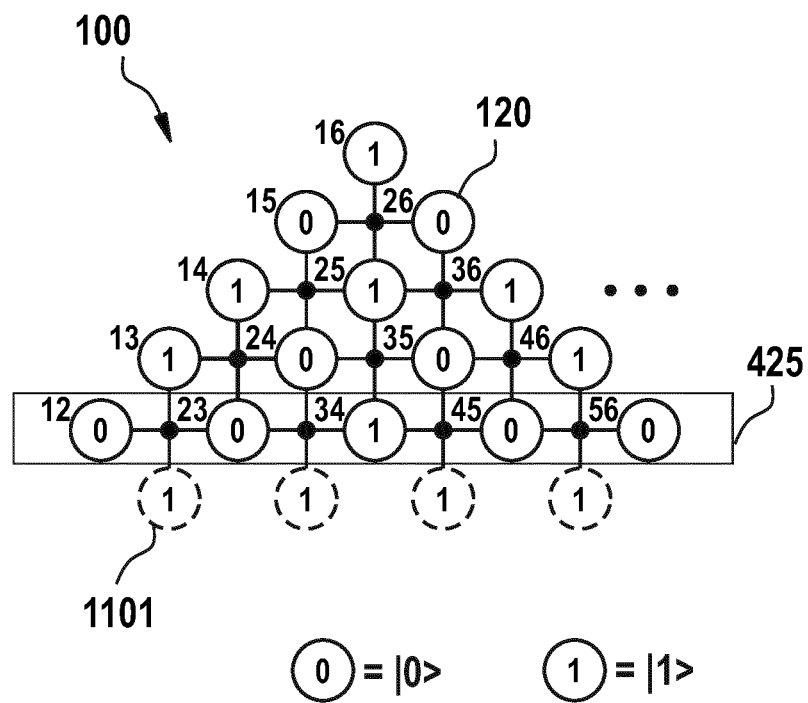
Figure 12:
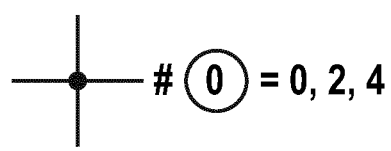
Figures 13, 14, 15:
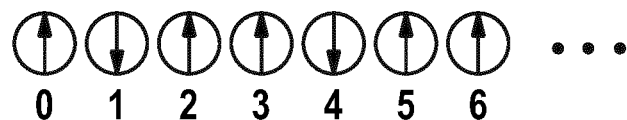
Figure 16:
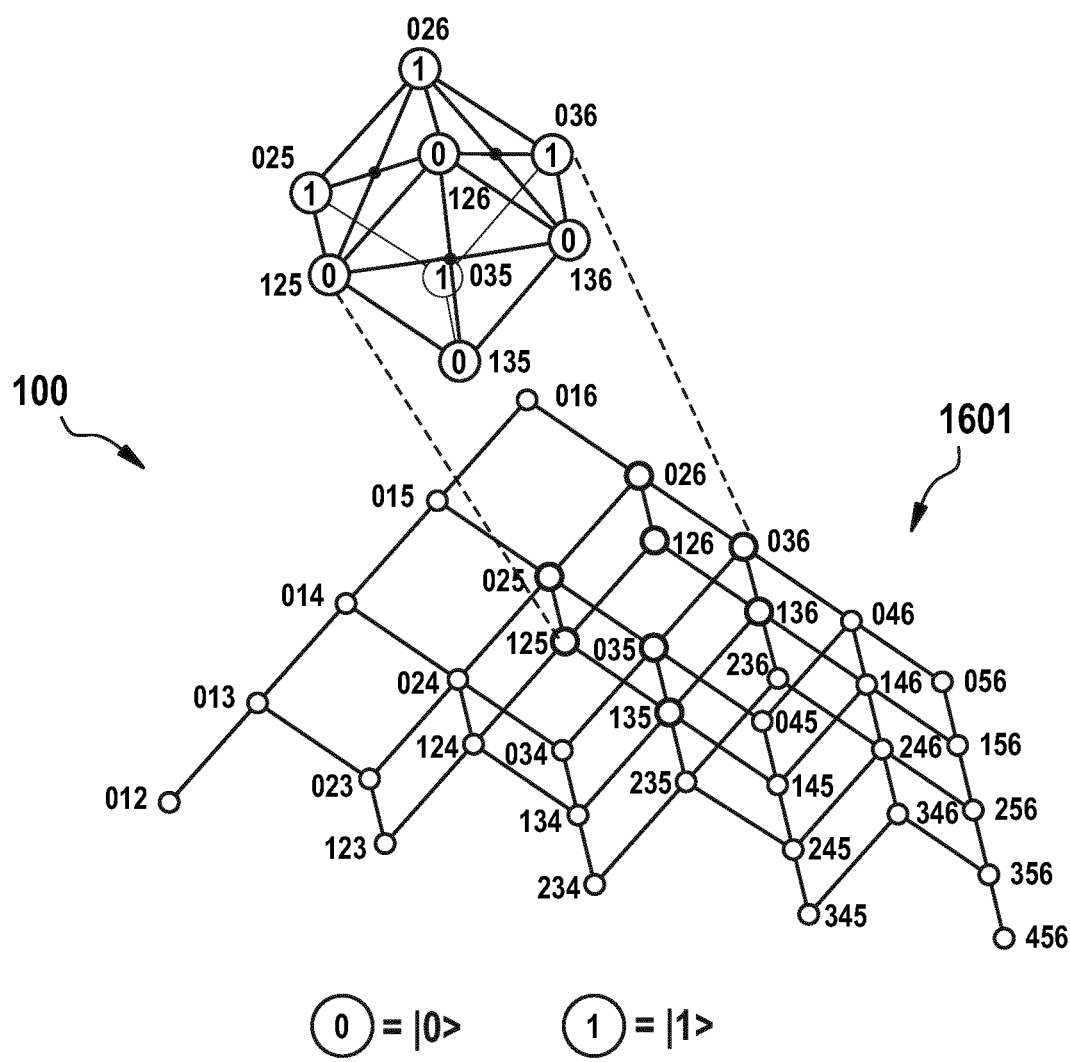

Since pairs of antiparallel spins are mapped to qubits being in the quantum basis state |0>, every set of qubits in the quantum system corresponding to a closed loop of spins in the Ising spin model has an even number of quantum basis states |0>. This provides a set of constraints for at least a portion of the qubits of the quantum system. For example, for the closed loop discussed above with reference to FIG. 9, the corresponding group of four qubits is shown in FIG. 11, indicated with reference numerals 14, 24, 23 and 13 in view of the correspondence between pairs of spins in the Ising model and qubits in the quantum system. A shown in FIG. 11, the qubits 14, 24, 23 and 13 correspond to a plaquette of the 2-dimensional lattice 120. In view of the constraint on the closed loop as described above, any configuration of quantum basis states for the qubits 14, 24, 23 and 13 includes either zero, 2 or four quantum basis states |0>, as illustrated in FIG. 12.

To ensure that the constraints corresponding to all closed loops are satisfied, it is sufficient to enforce constraints associated to a suitable subset of closed loops. According to this embodiment, particular building blocks of closed loops involving groups of at most four spins are sufficient to ensure that that all constraints are satisfied, so that a consistent mapping from the Ising spin model to the quantum system provided. The building blocks include closed loops consisting of four spins connected by four connections, wherein one connection has an index distance s, two connections have index distance s+1 and one connection has index distance s+2. Therein, s ranges from 1 to N−2 and the notion of an "index distance" between spins $s_i$ and $s_j$ refers to the number |i−j|. The set of building block closed loops with s=1 provide n−2 constraints. For example, the closed loop including the connections 14, 24, 23 and 13 between spins 1, 2, 3 and 4, as shown in FIG. 9 and as described above, is a building block closed loop with s=1.

A further aspect relates to the boundary of the quantum system. Some building block closed loops involve a group of three spins connected with three connections, instead of four spins connected with four connections. For example, in reference to FIG. 9, the closed loop including the connections 12, 23 and 13 between the spins 1, 2 and 3 may be considered in this respect. The corresponding group of qubits in the quantum system includes three qubits 12, 23 and 13 arranged according to triangular-shaped plaquette of the 2-dimensional lattice. To enforce the constraint corresponding to the closed loop of three spins, a 3-body constraint Hamiltonian $C_l$ may be considered acting on the corresponding group of three qubits. Alternatively, an additional line of n−2 auxiliary qubits fixed in the quantum basis state |1> may be included in the quantum system, as shown in FIG. 11 by the circles with dashed lines. To enforce a constraint corresponding to a closed loop of three spins, e.g. the closed loop corresponding to the qubits 12, 23 and 13, a constraint Hamiltonian $C_l$ may be considered acting on the corresponding three qubits and on one of the auxiliary qubits, namely the auxiliary qubit 1101 shown in FIG. 11. Accordingly, the constraint Hamiltonian $C_l$ is a 4-body Hamiltonian acting on a plaquette of an enlarged 2-dimensional lattice, having the same form as described above. The latter realization has the advantage that all constraint Hamiltonians can be treated on the same footing, since all constraint Hamiltonians are 4-body Hamiltonians corresponding to plaquettes of a 2-dimensional lattice.

The constraint Hamiltonians $C_l$ ensure that the constraints corresponding to the building block closed loops, and thus the constraints corresponding to all closed loops, are satisfied. Accordingly, the short-range Hamiltonian provides for a consistent mapping from constraints on the spins in the Ising spin model to constraints imposed on the quantum system.

To provide the readout, a portion of the qubits can be measured, such as e.g. the portion 425 shown in FIG. 11. If the quantum system is in the ground state of the final Hamiltonian, the qubits in the portion 425 will be in a configuration of quantum basis states corresponding to a configuration of spins in the ground state of the Ising spin model. If the quantum system is in a thermal state of the final Hamiltonian close to the ground state, i.e. at sufficiently low temperature, this is true with high probability. Accordingly, measuring the portion 425 allows determining a solution to the Ising spin model problem, at least with a high probability. If the quantum system is in the final state, as described herein, wherein the final state is well-approximated by the ground state of the final Hamiltonian, measuring the portion 425 will thus at least provide information about the ground state of the Ising model, from which a trial solution can be computed. It can then be tested by classical computing in polynomial time whether the trial solution is a true solution and, if not, the computation can be repeated until a true solution is found.

As a further advantage of embodiments described herein, since information about the Ising spin model is encoded in a redundant manner in the quantum system, a variety of possible groups of qubits can be measured to provide a readout from which a solution to the computational problem can be determined.

In light of the above, the construction of the short-range Hamiltonian according to this embodiment is such that (i) the constraints cover all interactions between the spins, (ii) the number of constraints is $(n^2-3n)/2$ and (iii) the short-range Hamiltonian can be realized on a simple 2-dimensional geometry with d-body interactions, wherein d=4, and wherein interactions correspond to plaquettes of the 2-dimensional lattice. Further, this embodiment allows for a scalable implementation, since adding one spin in the Ising spin model is equivalent to adding a line of n spins to the quantum system.

The embodiment described with reference to FIGS. 9-12 relates to an Ising spin model involving pairwise interactions between n spins, wherein the field coefficients are zero. A similar encoding can be considered for an Ising spin model with non-zero field coefficients. An additional spin $s_{n+1}$ can be included in the Ising model, wherein $s_{n+1}$ is fixed to the value +1. The non-zero field coefficients may then be reformulated as coupling coefficients between the n spins and the additional spin $s_{n+1}$. The Ising spin model with non-zero field coefficients is thus mapped to an Ising spin model wherein the field coefficients are zero. A mapping to a quantum system in the manner described above can thus be applied. Adding the additional spin $s_{n+1}$ involves including an additional line of n qubits to the quantum system.

Further, an encoding can also be considered for an Ising spin model involving interactions between groups of three spins. In this case, the Ising energy function may have the form $$H(s_1, s_2, \ldots, s_n) = \Sigma_{ij} c_{ijk} s_i s_j s_k$$

wherein the coefficients $c_{ijk}$ represent 3-body interactions between the spins $s_i$, $s_j$ and $S_k$, and wherein i>j>k. A mapping of such a 3-body Ising model onto a quantum system and an encoding of the corresponding Ising spin model problem into a problem Hamiltonian of the quantum system are illustrated in FIGS. 13-16. In this embodiment, the qubits in the quantum system correspond to triples of spins in the 3-body Ising model. In the 3-body Ising model, there are R=n(n−1)(n−2)/6 triples of spins. Accordingly, the number of qubits is R or more, wherein additional qubits may be included, e.g. ancillary qubits and/or auxiliary qubits in analogy to the mapping for the 2-body Ising spin model described above. In this embodiment, the plurality of qubits is arranged according to a 3-dimensional square lattice 1601 shown in FIG. 16. The problem Hamiltonian may have the form $\rho_k J_k \sigma_z^{(k)}$, similar to the case of an Ising spin model involving at most 2-body interactions between the spins. The short-range Hamiltonian may have the form $\Sigma_l C_l$ wherein the constraint Hamiltonians $C_l$ correspond to plaquettes of the 3-dimensional square lattice. The number of constraint Hamiltonians may be 2(R−n). Similar considerations relating to the boundary of the quantum system, involving 3-body constraint Hamiltonians and/or the inclusion of ancillary qubits and/or auxiliary qubits, apply to this embodiment as well.

Figure 17:
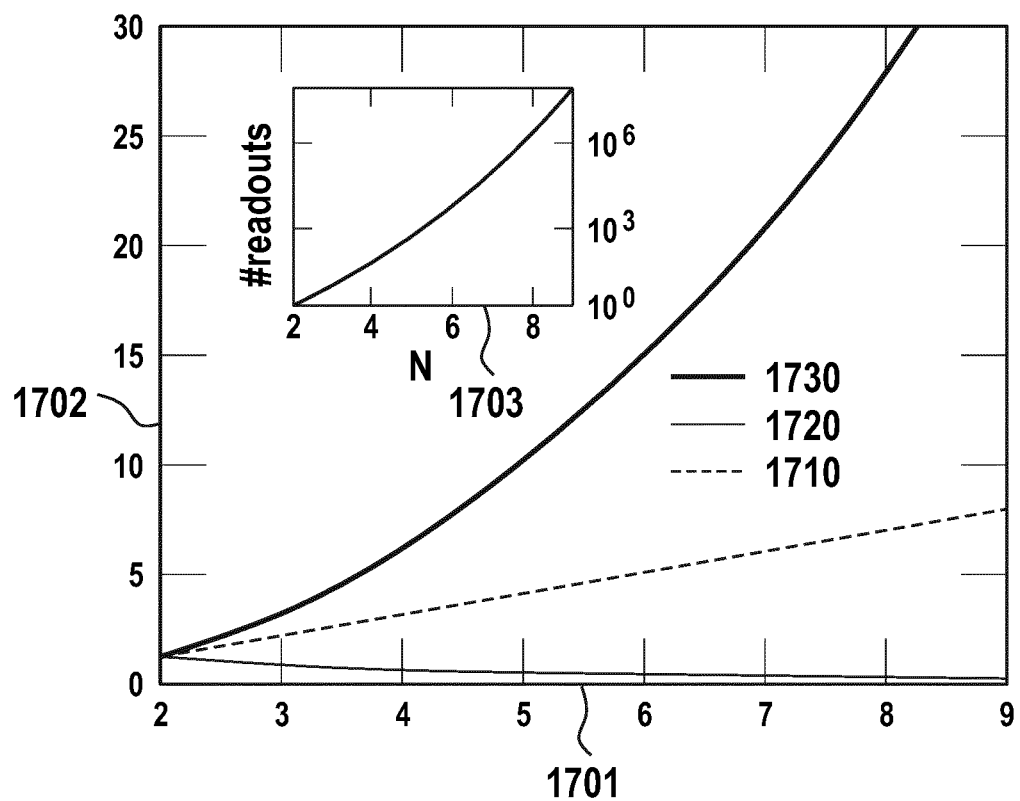
FIG. 17 illustrates advantages of embodiments described herein relating to the robustness of the quantum system against errors.

A further advantage of the embodiments described herein is the prevention and/or correction of errors in the quantum system. For instance, for a small quantum system with 4 qubits, static errors are reduced or even vanish for C being greater than 1.5 J where J=max($|c_{ij}|$), in particular for C being about 1.5 J. Generally, static errors are reduced or may even vanish if C is larger than (n−2) max ($|c_{ij}|$) with n representing the number of spins in the Ising spin model. Further, the number of qubits N in the quantum system is larger than the number of spins in the Ising spin model, e.g. N be n(n−1)/2 or more. Accordingly, information regarding the Ising spin model is encoded in the quantum system in a redundant manner. This redundancy allows to implement an error-correcting measurement with decreased sensitivity to errors from decoherence. Measuring multiple possible combinations of qubits allows to detect and correct for decoherence in the quantum system, similar to error correction schemes in topological quantum memory. FIG. 17 illustrates advantages of the embodiments described herein relating to the prevention and/or correction of errors in the quantum system. In FIG. 17, axis 1701 relates to the number of spins n. Axis 1702 relates to the error scaling. Further, the curves 1710, 1720 and 1730 show the behavior of the error, the information loss and the number of spin flips, respectively. In the inset, axis 1703 relates to the number of spins and axis 1703 relates to the number of readouts.

According to a further embodiment, a quantum processing unit [QPU] is provided. The quantum processing unit is adapted to serve as a central processing unit in apparatuses for computing solutions to computational problems. The quantum processing unit [QPU] includes a quantum system, as described herein. The quantum system [QS] includes a plurality of qubits, as described herein. The quantum processing unit is adapted to perform the methods according to embodiments described herein.

The quantum processing unit may be adapted for embodying an initial Hamiltonian $H^{init}$ at an initial time $t=t_0$. The quantum processing unit may further be adapted for embodying a final Hamiltonian $H^{final}$ at a final time $t=t_{fin}$. Therein, the wording "embodying a Hamiltonian" means that those quantum states of the quantum system [QS] which are relevant for the quantum computational functionality of the invention are mainly determined by the respective Hamiltonian according to the framework of Quantum Physics, i.e. the quantum computational properties of the quantum system [QS] are sufficiently determined by said Hamiltonians and the conceivable further terms in the factual Hamiltonian of the quantum System [QS] are negligible concerning the functional principle of the invention.

The final Hamiltonian $H^{final}$ may be the sum of a problem Hamiltonian $H^{prob}$ and a short-range Hamiltonian $H^{SR}$, i.e. $H^{final}=H^{prob}+H^{SR}$. Therein, the problem Hamiltonian $H^{prob}$ may be a single-body Hamiltonian comprising (i.e. being a function of) a plurality of adjustable parameters $J_k$. The adjustable parameters $J_k$ may be individually adjustable in a way appropriate for encoding the computational problem.

The short-range Hamiltonian $H^{SR}$ may be a d-body Hamiltonian with d equal or greater than 2, and wherein d may be independent of the computational problem. Therein, the term "short-range Hamiltonian" may refer to a Hamiltonian representing interactions of the plurality of qubits, wherein no interactions occur between qubits which are distanced from each other by a distance greater than an interaction cut-off distance $L_{cut}$. The term "d-body Hamiltonian" may refer to a Hamiltonian representing interactions of the plurality of qubits, wherein no joint interactions occur between groups comprising d+1 or more qubits.

The quantum processing unit [QPU] may be adapted for measuring the quantum state of at least a portion of the plurality of the qubits of the quantum system [QS] after the time of $t=t_{fin}$.

The quantum processing unit [QPU] may be adapted for embodying an interpolation Hamiltonian H(t) of the form $H(t)=A(t)\cdot H^0+B(t)\cdot H^{prob}+C(t)\cdot H^{SR}$, where A(t), B(t) and C(t) are interpolation coefficients depending on the time parameter t, where $H^0$ is an initializing Hamiltonian which is appropriate for initializing the quantum system for the desired computational process. Therein A(t), B(t) and C(t) fulfil the conditions $A(t_0)=1$, $A(t_{fin})=0$, $B(t)=0$, $B(t_{fin})=1$, $C(t_{fin})=1$, such that $H(t_0)=H^{init}=H^0+C(t_0)\cdot H^{SR}$ and $H(t_{fin})=H^{fin}=H^{prob}+H^{SR}$, and wherein $C(t_0)$ is arbitrary and may also be 0 or 1.

The qubits of the plurality of qubits may be arranged according to a 2-dimensional lattice or according to a 3-dimensional lattice.

The qubits of the plurality of qubits may be situated at the corners of the plaquettes of the respective lattice, where the term "plaquette" may refer to meshes of the respective lattice.

The problem Hamiltonian may have the form $H^{prob}=\Sigma_k[J_k\cdot\sigma_z^{(k)}]$, where $\sigma_z^{(k)}$ may be a Pauli operator associated with a first spatial direction $z(r_k)$, said Pauli operator $\sigma_z^{(k)}$ acting on a k-th qubit of the plurality of qubits, and where z may refer to the direction vector of said first spatial direction and where $r_k$ denotes the position vector of the k-th qubit.

The initializing Hamiltonian $H^0$ may have a form which is appropriate for initializing the quantum system for the desired computational process and which preferably is easy to implement. For example, the initializing Hamiltonian may have the form $H^0=h\Sigma_k[\sigma_x^{(k)}]$, where h is a coefficient, where $\sigma_x^{(k)}$ is a Pauli operator associated with a second spatial direction $x(r_k)$, said Pauli operator $\sigma_x^{(k)}$ acting on a k-th qubit of the plurality of qubits, and where x is denotes the direction vector of said second spatial direction and where $r_k$ denotes the position vector of the k-th qubit, wherein $z(r_k)$ and $x(r_k)$ are preferably mutually orthogonal and wherein the Pauli operators •$\sigma_z^{(k)}$ and $\sigma_x^{(k)}$ are preferably non-commuting, in particular anti-commuting, operators.

The short-range Hamiltonian $H^{SR}$ may be a plaquette Hamiltonian $H^P$ which may have the form $H^{SR}=H^P:=\Sigma_l[C_l(\sigma_z^{(l,1)},\ldots,\sigma_z^{(l,m)},\ldots,\sigma_z^{(l,M[l])})]$, where l denotes the number of the l-th plaquette, (l,1) denotes the qubit situated at a first corner of the l-th plaquette, (l,m) denotes the qubit situated at the m-th corner of the l-th plaquette and (l,M[l]) denotes the qubit situated at the last (i.e. the M[l]-th) corner of the l-th plaquette, where $\sigma_z^{(l,m)}$ denotes the Pauli operator of the respective qubit and where the respective M[l]-body-summand $C_l(\sigma_z^{(l,1)},\ldots,\sigma_z^{(l,m)},\ldots,\sigma_z^{(l,M)})$ denotes the contribution of the l-th plaquette to the plaquette Hamiltonian $H^P$.

The short-range Hamiltonian $H^{SR}$ may be implemented in a way that only groups of qubits forming a plaquette of the respective qubit-lattice contribute summands to $H^{SR}=H^P$, and that, e.g., for a qubit-lattice consisting only of triangular plaquettes, $H^{SR}=H^P$ is a d-body Hamiltonian with d=M=3, and for a qubit-lattice consisting of triangular and quadrangular plaquettes, $H^P$ is a Hamiltonian comprising 3-body- and 4-body-summands and is thus a 4-body Hamiltonian.

The quantum processing unit [QPU] may include additional qubits and/or qutrits and/or q-level quantum systems and/or further components and devices adapted for the implementation of the desired features of the quantum system, in particular the desired features of the short-range Hamiltonian $H^{SR}$ and the plaquette Hamiltonian respectively.

The lattice according to which the qubits are arranged may be a substantially planar 2-dimensional lattice or a 3-dimensional lattice composed of substantially planar 2-dimensional sub-lattices, which are substantially mutually parallel and which are stacked with respect to the third dimension.

The qubits may be arranged on a substantially triangular-shaped portion of a 2-dimensional lattice, respectively on a basically triangular-shaped portion of each 2-dimensional sub-lattice.

The plurality of plaquettes formed by the respective qubit arrangement may be composed of a (majority) set of quadrangular plaquettes and of a (minority) set of triangular plaquettes. Alternatively or additionally, the plurality of plaquettes formed by the respective qubit arrangement may be composed of only quadrangular plaquettes, e.g. by adding additional qubits to the quantum system which complete all plaquettes to quadrangular ones.

The summands $C_l$ of the plaquette Hamiltonian $H^P=\Sigma_l[C_l]$ may be of one of the two forms:

$$C_l=-c_l(\Sigma_{m=1}^{M(l)}(\sigma_x^{(l,m)})^2+S_z^l)^2, \text{ or} \qquad \text{i})$$

$$C_l=-c_l\sigma_z^{(l,1)}\sigma_z^{(l,2)}\sigma_z^{(l,3)}\sigma_z^{(l,4)} \text{ for quadrangular plaquettes and}$$

$$C_l=-c_l\sigma_z^{(l,1)}\sigma_z^{(l,2)}\sigma_z^{(l,3)} \text{ for triangular plaquettes,} \qquad \text{ii})$$

where $c_l$ is a coefficient and $S_z^l$ is the Pauli operator of an ancilla qutrit.

The spatial arrangement of the qubits of the quantum system, and/or the assignment of the coefficients $J_k$ of the problem Hamiltonian $H^{prob}$ to the spatial coordinates of the qubits of the quantum system and/or the implementation of the short-range Hamiltonian and/or an advantageous determination of the portion of qubits which are measured to provide a read-out may be executed in accordance with a mapping of a known two-body quantum interaction model or of a known three-body quantum interaction model (e.g. a two-body or three-body all-to-all Ising spin model) to the quantum system [QS], in particular in accordance with constraints (e.g. closed-loop constraints) deducible from said mapping.

The quantum processing unit may be adapted for cooling the quantum system [QS] towards the ground state of $H^{init}:=H(t_0)$.

The quantum processing unit may be adapted for cooling the quantum system [QS] towards the ground state of $H^{fin}:=H(t_{fin})$.

The quantum processing unit may be adapted for cooling the quantum system [QS] towards the ground state of H(t) at any one or all times between $t=t_0$ and $t=t_{fin}$.

The quantum processing unit may be adapted for evolving the interpolation Hamilton H(t) from $H^{init}$ to $H_{fin}$ gradually, in particular executing said evolution according to an adiabatic quantum annealing protocol.

The quantum processing unit may include a plurality of superconducting qubits arranged according to a two-dimensional lattice.

The quantum processing unit may include a magnetic flux bias assembly including a plurality of magnetic flux bias units configured for generating a plurality of adjustable magnetic fluxes, wherein each adjustable magnetic flux acts on a single superconducting qubit in the plurality of superconducting qubits.

The quantum processing unit may include a coupling unit including at least one superconducting quantum interference device configured for coupling the plurality of superconducting qubits according to a plaquette Hamiltonian $H^P$.

The quantum processing unit may include a controller connected to the magnetic flux bias unit and to the coupling unit.

The controller may be configured for receiving a problem-encoding configuration for a plurality of adjustable parameters of a problem Hamiltonian $H^P$ of the quantum system, wherein the problem Hamiltonian is a single-body Hamiltonian, and wherein the problem-encoding configuration encodes a computational problem, as described herein.

The controller may be configured for controlling the magnetic flux bias assembly and the coupling unit to evolve an initial Hamiltonian $H^{init}$ of the quantum system into a final Hamiltonian $H^{fin}$ of the quantum system by quantum annealing, wherein the final Hamiltonian $H^{fin}$ is the sum of the plaquette Hamiltonian $H^P$ and the problem Hamiltonian $H^{prob}$, wherein the plurality of adjustable parameters $J_k$ of the problem Hamiltonian $H^{prob}$ are in the problem-encoding configuration.

According to embodiments, the apparatuses described herein are adapted for performing the methods according to embodiments described herein.

According to further embodiments, a quantum processing device is provided. The quantum processing device may be configured to compute solutions to computational problems as described herein. The quantum processing device includes a quantum processing unit (QPU). The quantum processing unit includes plaquettes of qubits. The plaquettes may be the elementary cells of a 2-dimensional or 3-dimensional lattice. The plaquettes may include at most four or at most three qubits. The quantum processing unit may include plaquettes including qubits and one or more ancilla qubits, e.g., one ancilla qubit prepared in a specific quantum state. The qubits, or qubits and ancilla qubit(s), as the case may be, may be arranged at the corners of the plaquettes. The quantum processing device may include auxiliary q-level systems, e.g., auxiliary qutrits, arranged within some or all of the plaquettes. The auxiliary q-level systems may mediate interactions between the qubits, or qubits and ancilla qubit(s), of a plaquette. The plaquettes may be arranged to form a square lattice or a part thereof. Specifically, the plaquettes may be arranged to form a triangular portion of square lattice.

The quantum processing unit may further include a first device including units that interact with single qubits or ancilla qubits, and a second device including units that interact with the qubits of a plaquette, or qubits and ancilla qubit(s) of a plaquette. The first device may be configured to implement a single-body Hamiltonian on the qubits of the plaquettes, or qubits and ancilla qubit(s) of the plaquettes. The second device may be configured to implement a plaquette Hamiltonian on the qubits of the plaquettes, or qubits and ancilla qubit(s) of the plaquettes.

According to some embodiments, the qubits are superconducting qubits. The ancilla qubit(s), if present, may also be superconducting qubits. The plaquettes are arranged to form a 2-dimensional square lattice or a portion thereof, in particular a triangular portion thereof. The quantum processing unit includes a magnetic flux bias assembly comprising a plurality of magnetic flux bias units configured for generating a plurality of adjustable magnetic fluxes, wherein each adjustable magnetic flux acts on a single superconducting qubit of a plaquette. The magnetic flux bias assembly may be configured for implementing a single-body Hamiltonian on the superconducting qubits, or superconducting qubits and superconducting ancilla qubit(s), of the plaquettes of the 2-dimensional or 3-dimensional lattice The quantum processing unit includes superconducting quantum interference devices, wherein each quantum interference device couples the superconducting qubits of a plaquette, or the superconducting qubits and superconducting ancilla qubit(s) of a plaquette. A quantum interference device may provide for a controlled interaction of the superconducting qubits of a plaquette, or the superconducting qubits and the superconducting ancilla qubit(s) of a plaquette. The quantum interference devices may be components of a quantum coupling unit configured for implementing a plaquette Hamiltonian on the plaquettes of the 2-dimensional or 3-dimensional lattice.

The quantum processing unit (QPU) may be configured to perform the methods of computing a solution to computational problems as described herein. The quantum processing device may further include components such as a cooling unit, a classical computing device, and a controller as described herein. For instance, the controller may be connected to the magnetic flux bias unit and to the coupling unit and may be configured for: (i) receiving a problem-encoding configuration for a plurality of adjustable parameters of a problem Hamiltonian of the quantum system, wherein the problem Hamiltonian is a single-body Hamiltonian, and wherein the problem-encoding configuration encodes a computational problem; and (ii) controlling the magnetic flux bias assembly and the coupling unit to evolve an initial Hamiltonian of the quantum system into a final Hamiltonian of the quantum system by quantum annealing, wherein the final Hamiltonian is the sum of the plaquette Hamiltonian and the problem Hamiltonian, wherein the plurality of adjustable parameters of the problem Hamiltonian are in the problem-encoding configuration.

Embodiments described herein may not only be realized with qubits (i.e. 2-level quantum bits), but also with qutrits or q-level quantum systems with arbitrary q. The different ways in which the quantum system may be realized, using e.g. superconducting qubits, trapped ions, quantum dots and NV centers, can be extended to q-level systems, in particular qutrit systems, by considering more than two states. Manipulation and readout of q-level systems and interactions between them can be realized by extensions of the embodiments described above.

While the foregoing is directed to some embodiments of the invention, other and further embodiments may be devised without departing from the scope determined by the claims that follow.

The invention claimed is:

1. A method of computing a solution to a computational problem using a quantum system comprising a plurality of qubits, the method comprising:

encoding the computational problem into a problem Hamiltonian of the quantum system, wherein the problem Hamiltonian is a single-body Hamiltonian comprising a plurality of adjustable parameters, and wherein the encoding comprises determining, from the computational problem, a problem-encoding configuration for the plurality of adjustable parameters;

evolving the quantum system from an initial quantum state towards a ground state of a final Hamiltonian of the quantum system, wherein the final Hamiltonian is the sum of the problem Hamiltonian and a short-range Hamiltonian, wherein the plurality of adjustable parameters of the problem Hamiltonian are in the problem-encoding configuration, wherein the short-range Hamiltonian is a Hamiltonian representing interactions of a plurality of qubits, wherein no interactions in the short-range Hamiltonian occur between qubits which are distanced from each other by a distance greater than an interaction cut-off distance, wherein the interaction cut-off distance is smaller than a maximal qubit distance between the qubits, and wherein the short-range Hamiltonian is a d-body Hamiltonian and d is independent of the computational problem;

measuring at least a portion of the plurality of qubits to obtain a read-out of the quantum system; and determining a solution to the computational problem from the read-out.

2. The method of claim 1, wherein evolving the quantum system from the initial quantum state towards the ground state of the final Hamiltonian comprises passing from an initial Hamiltonian of the quantum system to the final Hamiltonian by quantum annealing.

3. The method of claim 2, further comprising initializing the quantum system in the initial quantum state by cooling the quantum system towards a ground state of the initial Hamiltonian.

4. The method of claim 1, wherein the plurality of adjustable parameters comprise a plurality of field strengths and/or a plurality of field directions of single-body fields acting on the plurality of qubits.

5. The method of claim 2, wherein performing quantum annealing from the initial Hamiltonian to the final Hamiltonian comprises adiabatically evolving the initial Hamiltonian into the final Hamiltonian.

6. The method of claim 1, wherein the short-range Hamiltonian is a d-body Hamiltonian, wherein d=4.

7. The method of claim 1, wherein the short-range Hamiltonian is independent of the computational problem.

8. The method of claim 1, wherein the plurality of qubits are arranged according to a 2-dimensional lattice or according to a 3-dimensional lattice.

9. The method of claim 1, wherein the plurality of qubits are arranged according to a 2-dimensional lattice and wherein the short-range Hamiltonian involves interactions between groups of four qubits corresponding to plaquettes of the 2-dimensional lattice.

10. The method of claim 1, wherein the computational problem is an NP-hard problem.

11. The method of claim 1, wherein the problem Hamiltonian has the form $\Sigma_k J_k \sigma_z^{(k)}$, wherein $\sigma_z^{(k)}$ is a Pauli operator of a k-th qubit of the plurality of qubits, wherein each $J_k$ is a coefficient, and wherein the coefficients $J_k$ form the plurality of adjustable parameters of the problem Hamiltonian.

12. The method of claim 1, wherein determining the problem-encoding configuration comprises:

mapping the computational problem onto an auxiliary computational problem, wherein the auxiliary computational problem comprises determining a ground state of a long-range spin model, particularly a long-range spin model with m-body interactions, wherein m is 1, 2 or 3; and determining the problem-encoding configuration from the long-range spin model.

13. The method of claim 12, further comprising:

determining the short-range Hamiltonian from a plurality of closed loops of spins in the long-range spin model.

14. An apparatus for computing solutions to computational problems, comprising:

a quantum system comprising a plurality of qubits;

a cooling unit adapted for cooling the quantum system towards a ground state of the quantum system;

a programmable quantum annealing unit adapted for evolving, by quantum annealing, an initial Hamiltonian of the quantum system into a final Hamiltonian of the quantum system, wherein the final Hamiltonian is a sum of a problem Hamiltonian and a short-range Hamiltonian, wherein the problem Hamiltonian is a single-body Hamiltonian comprising a plurality of adjustable parameters, wherein the short-range Hamiltonian is a Hamiltonian representing interactions of a plurality of qubits, wherein no interactions in the short-range Hamiltonian occur between qubits which are distanced from each other by a distance greater than an interaction cut-off distance, wherein the interaction cut-off distance is smaller than a maximal qubit distance between the qubits;

a measurement device adapted for measuring at least a portion of the plurality of qubits; and a classical computing system connected to the programmable quantum annealing unit and to the measurement device, wherein the classical computing system is configured for:

receiving, as an input, a computational problem;

encoding the computational problem into the problem Hamiltonian, wherein the encoding comprises determining, from the computational problem, a problem-encoding configuration for the plurality of adjustable parameters of the problem Hamiltonian; and communicating the problem-encoding configuration to the quantum annealing unit;

wherein the programmable quantum annealing unit is configured for:

receiving the problem-encoding configuration from the classical computing system; and evolving, by quantum annealing, the initial Hamiltonian into the final Hamiltonian, wherein the plurality of adjustable parameters of the problem Hamiltonian are in the problem-encoding configuration; and wherein the classical computing system is further configured for receiving a read-out of the quantum system from the measurement device; and determining a solution to the computational problem from the read-out.

15. A programmable quantum annealing device for computing solutions to computational problems, comprising:

a quantum system comprising a plurality of superconducting qubits arranged according to a two-dimensional lattice;

a magnetic flux bias assembly comprising a plurality of magnetic flux bias units configured for generating a plurality of adjustable magnetic fluxes, wherein each adjustable magnetic flux acts on a single superconducting qubit in the plurality of superconducting qubits;

a coupling unit comprising at least one superconducting quantum interference device configured for coupling the plurality of superconducting qubits according to a plaquette Hamiltonian; and a controller connected to the magnetic flux bias unit and to the coupling unit, configured for:
- receiving a problem-encoding configuration for a plurality of adjustable parameters of a problem Hamiltonian of the quantum system, wherein the problem Hamiltonian is a single-body Hamiltonian, and wherein the problem-encoding configuration encodes a computational problem; and
- controlling the magnetic flux bias assembly and the coupling unit to evolve an initial Hamiltonian of the quantum system into a final Hamiltonian of the quantum system by quantum annealing, wherein the final Hamiltonian is the sum of the plaquette Hamiltonian and the problem Hamiltonian, wherein the plurality of adjustable parameters of the problem Hamiltonian are in the problem-encoding configuration.

* * * * *